(12) United States Patent
Ziarno

(10) Patent No.: US 9,026,336 B2
(45) Date of Patent: May 5, 2015

(54) WIRELESS ENGINE MONITORING SYSTEM WITH MULTIPLE HOP AIRCRAFT COMMUNICATIONS CAPABILITY AND ON-BOARD PROCESSING OF ENGINE DATA

(71) Applicant: Harris Corporation, Melbourne, FL (US)

(72) Inventor: James J. Ziarno, Malabar, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/148,999

(22) Filed: Jan. 7, 2014

(65) Prior Publication Data

US 2014/0114549 A1 Apr. 24, 2014

Related U.S. Application Data

(62) Division of application No. 13/489,642, filed on Jun. 6, 2012.

(51) Int. Cl.
*G06G 7/70* (2006.01)
*B60T 7/12* (2006.01)
*G01M 15/14* (2006.01)
(Continued)

(52) U.S. Cl.
CPC ....... *G01M 15/14* (2013.01); *B64D 2045/0085* (2013.01); *G05B 23/0213* (2013.01)

(58) Field of Classification Search
CPC .................... G05B 23/0213; B64D 2045/0085
USPC .......................................................... 701/100
See application file for complete search history.

(56) References Cited

U.S. PATENT DOCUMENTS 4,280,185 A * 7/1981 Martin ............................. 701/99
4,642,775 A 2/1987 Cline et al. ..................... 364/443
(Continued)

FOREIGN PATENT DOCUMENTS

EP 0 407 179 A1 9/1991 ............. B64D 43/00
GB 2 276 006 A 9/1994 ............. G08C 17/00
(Continued)

OTHER PUBLICATIONS

"Wired Datalink for the Parked Airplane," Paper Presented at AEEC Data Link Subcommittee Meeting, May 16, 1989, 10 pages.
(Continued)

*Primary Examiner* — Khoi Tran
*Assistant Examiner* — Harry Oh
(74) *Attorney, Agent, or Firm* — Allen, Dyer, Doppelt, Milbrath & Gilchrist, P.A.

(57) ABSTRACT

An engine monitoring module includes a housing configured to be mounted at the aircraft engine and a first wireless transmitter carried by the housing. A memory is carried by the housing and a processor is carried by the housing and coupled to the memory and the first wireless transmitter and configured to collect and store in the memory engine data relating to at least one engine parameter sensed during operation of the aircraft engine by a plurality of engine sensors that transmit the engine data via the first wireless transmitter. A wireless receiver is located within the aircraft and configured to receive the engine data transmitted from the first wireless transmitter. A second wireless transmitter is located within the aircraft and operatively connected to the wireless receiver and configured to receive and transmit the engine data.

16 Claims, 14 Drawing Sheets

(51) Int. Cl.
*G05B 23/02* (2006.01)
*B64D 45/00* (2006.01)

(56) References Cited

U.S. PATENT DOCUMENTS

| | | | |
|---|---|---|---|
| 4,718,229 A | 1/1988 | Riley | 60/39.281 |
| 4,729,102 A | 3/1988 | Miller, Jr. et al. | 364/424 |
| 4,872,182 A | 10/1989 | McRae et al. | 375/1 |
| 4,908,618 A | 3/1990 | Baker et al. | 340/945 |
| 5,022,024 A | 6/1991 | Paneth et al. | 370/50 |
| 5,031,396 A | 7/1991 | Margnelli | 60/39.31 |
| 5,249,417 A | 10/1993 | Duesler et al. | 60/39.02 |
| 5,266,922 A | 11/1993 | Smith et al. | 340/525 |
| 5,280,702 A | 1/1994 | Jaw | 60/39.03 |
| 5,339,330 A | 8/1994 | Mallinckrodt | 375/1 |
| 5,351,194 A | 9/1994 | Ross et al. | 364/449 |
| 5,359,446 A | 10/1994 | Johnson et al. | 359/152 |
| 5,445,347 A | 8/1995 | Ng | 236/169 |
| 5,459,469 A | 10/1995 | Schuchman et al. | 342/37 |
| 5,463,656 A | 10/1995 | Polivka et al. | 375/200 |
| 5,485,868 A | 1/1996 | Jaw et al. | 137/601 |
| 5,521,958 A | 5/1996 | Selig et al. | |
| 5,557,917 A | 9/1996 | Jaw | 60/39.02 |
| 5,652,717 A | 7/1997 | Miller et al. | 364/578 |
| 5,757,772 A | 5/1998 | Thornberg et al. | 370/236 |
| 5,761,625 A | 6/1998 | Honcik et al. | 701/14 |
| 5,905,466 A | 5/1999 | Jha | 343/700 |
| 5,943,399 A | 8/1999 | Bannister et al. | 379/88.17 |
| 6,009,356 A | 12/1999 | Monroe | 701/14 |
| 6,047,165 A | 4/2000 | Wright et al. | 455/66.1 |
| 6,088,632 A | 7/2000 | Zaccaria et al. | 701/3 |
| 6,148,179 A | 11/2000 | Wright et al. | 455/66 |
| 6,181,990 B1* | 1/2001 | Grabowsky et al. | 701/14 |
| 6,195,247 B1 | 2/2001 | Cote et al. | 361/253 |
| 6,278,913 B1 | 8/2001 | Jiang | 701/3 |
| 6,304,784 B1 | 10/2001 | Allee et al. | 607/116 |
| 6,308,045 B1 | 10/2001 | Wright et al. | 455/431 |
| 6,353,734 B1* | 3/2002 | Wright et al. | 455/98 |
| 6,385,513 B1 | 5/2002 | Murray et al. | 701/14 |
| 6,438,960 B1 | 8/2002 | Jaw | 60/772 |
| 6,490,543 B1 | 12/2002 | Jaw | 702/182 |
| 6,498,978 B2 | 12/2002 | Leamy et al. | 701/100 |
| 6,519,943 B2 | 2/2003 | Jaw | 60/772 |
| 6,747,577 B2 | 6/2004 | Chakravarty et al. | 390/945 |
| 6,781,513 B1 | 8/2004 | Korkosz et al. | 340/539.1 |
| 6,871,160 B2 | 3/2005 | Jaw | 702/182 |
| 6,894,611 B2 | 5/2005 | Butz et al. | 340/539.1 |
| 6,898,554 B2 | 5/2005 | Jaw et al. | 702/185 |
| 6,943,699 B2 | 9/2005 | Ziarno | 340/945 |
| 7,176,808 B1 | 2/2007 | Broad et al. | |
| 7,231,180 B2 | 6/2007 | Benson et al. | 455/41.2 |
| 7,456,756 B2 | 11/2008 | Ziarno | 340/945 |
| 7,496,798 B2 | 2/2009 | Link et al. | 714/47 |
| 7,595,739 B2 | 9/2009 | Ziarno | 340/945 |
| 7,755,512 B2 | 7/2010 | Ziarno | 340/945 |
| 7,974,637 B1 | 7/2011 | Taveniku | 455/456.1 |
| 8,220,038 B1 | 7/2012 | Lucchesi et al. | |
| 8,589,994 B2* | 11/2013 | Monroe | 725/105 |
| 2002/0018008 A1 | 2/2002 | Wright et al. | 340/945 |
| 2002/0123915 A1 | 9/2002 | Denning et al. | |
| 2003/0105565 A1 | 6/2003 | Loda et al. | 701/33 |
| 2003/0148735 A1 | 8/2003 | Wright et al. | 370/343 |
| 2003/0176954 A1 | 9/2003 | Jaw | 701/3 |
| 2004/0049715 A1 | 3/2004 | Jaw | 714/43 |
| 2004/0206818 A1 | 10/2004 | Loda et al. | |
| 2005/0275563 A1* | 12/2005 | Ziarno | 340/945 |
| 2007/0100529 A1 | 5/2007 | Blythe et al. | |
| 2008/0054645 A1 | 3/2008 | Kulkarni et al. | |
| 2008/0092520 A1* | 4/2008 | Brown | 60/226.1 |
| 2008/0119968 A1* | 5/2008 | Loda | 701/3 |
| 2009/0231162 A1* | 9/2009 | Ziarno | 340/945 |
| 2009/0243895 A1* | 10/2009 | Mitchell et al. | 340/971 |
| 2009/0248366 A1 | 10/2009 | Scheid et al. | 702/188 |
| 2010/0049377 A1 | 2/2010 | Scheid et al. | 701/3 |
| 2010/0073197 A1 | 3/2010 | Eagleton et al. | 340/945 |
| 2010/0211236 A1 | 8/2010 | Ziarno | 701/3 |
| 2010/0232295 A1 | 9/2010 | True et al. | 370/238 |
| 2011/0056214 A1* | 3/2011 | Brown | 60/803 |
| 2011/0173988 A1 | 7/2011 | Sweet et al. | |

FOREIGN PATENT DOCUMENTS

| | | | |
|---|---|---|---|
| JP | S63-42832 | 3/1988 | F02C 9/00 |
| JP | H10508354 T | 8/1998 | F01D 25/00 |
| JP | 2002028575 A | 1/2002 | B07C 5/00 |
| JP | 2002225823 A | 8/2002 | B65B 17/02 |
| JP | 2002312518 | 10/2002 | G06Q 50/00 |
| JP | 2003044546 | 2/2003 | G05B 19/418 |
| WO | 2010028729 | 3/2010 | |

OTHER PUBLICATIONS

Mini QAR (Quick-Access Recorder), Avionics Test Solutions brochure, published by Avionica, 1996, 3 pages.

Future Concepts for Maintenance, Report of the Portable Maintenance Access Terminal (PMAT) Working Group Meeting, ARINC, 94-205/FFCM-69, Sep. 1, 1994, 38 pages.

Gate-Aircraft Terminal Environment Link (Gatelink)—Ground Side, ARINC Specification 632, Dec. 30, 1994.

Airlines Electronic Engineering Committee Letter 91-079/DLK-391, Apr. 5, 1991.

Gate-Aircraft Terminal Environment Link (Gatelink)—Aircraft Side, ARINC Characteristic 751, Jan. 1, 1994.

Aviation Week & Space Technology, "*Safety Board Urges Mandatory Use of FDR/CVRs in Commuter Transports*,"Avionics, p. 73, McGraw-Hill, Inc., Aug. 31, 1987.

Aviation Week & Space Technology, "*Conversion Approach Appears Flawed*," Aerospace Business, vol. 139, No. 4, p. 48, McGraw-Hill, Inc., Jul. 31, 1993.

Electronic Engineering Times, "*Module is Result of Work With Apple—Plessey Makes Leap With Wireless LAN*," Nov. 7, 1994.

W.R. Beckman, "*L-1011 Flight Data Recording Systems—Background, Features, Implications and Benefits*,"AIAA Aircraft Systems and Technology Conference, Los Angeles, California, Aug. 21-23, 1978, 9 pages (Exhibit 8).

ARINC Characteristic 591, "*Quick Access Recorder for AIDS System(QAR)*," Airlines Electronic Engineering Committee, Aeronautical Radio, Inc., May 18, 1972, 21 pages (Exhibit 9).

Office Action in Ex Parte Reexamination mailed Dec. 19, 2007; U.S. Patent and Trademark Office, U.S. Appl. No. 90/008,567, filed Mar. 30, 2007; 21 pages.

"McGraw-Hill Illustrated Telecom Dictionary," Jade Clayton, 1998, pp. 390,391.

Bai et al., "*Wireless Sensor Network for Aircraft Health Monitoring*,"China Communications, Technology Forum, Feb. 2005, pp. 70-77.

Bai et al., "*Wireless Sensor Network for Aircraft Health Monitoring*," Proceedings of the First International Conference on Broadband Networks, Aug. 12, 2004, pp. 1-3.

Ashby et al., "*Intelligent Maintenance Advisor for Turbine Engines*," IEEE, 2000, pp. 211-219.

"*Systems for Engine Health Monitoring*," Maintenance & Engineering, Aircraft Commerce, Feb./Mar. 2006, Issue No. 44, pp. 53-57.

"*Health Monitoring, Finding Out What's Wrong in Advance*," Meggitt, Aerospace/Health Monitoring, Jun. 25, 2009, pp. 1-5.

"*Intelligent Fault Tolerant Engine Control*," Reports on a Project Between The Ohio State University and NASA Glenn Research Center, Controls and Dynamics Technology Branch, Oct. 27, 2010, http://www2.ece.ohio-state.edu/~passino/NASA.html, 4 pages.

Volponi et al., "*Development of an Information Fusion System for Engine Diagnostics and Health Management*," Prepared for the 39th Combustion/27th Airbreathing Propulsion/21st Propulsion Systems Hazards/3rd Modeling and Simulation Joint Subcommittee Meeting, Dec. 1-5, 2003, NASA/TM-2004-212924, Feb. 2004, 13 pages.

McConnell, "*Commercial: Engine Prognostics, Aircraft Operators and OEMs are Demanding Smarter Sensors to Monitor Turbine Engine Performance*," Internet Article, Aug. 1, 2007, http://aviationtoday.com/print/av/issue/feature/Commercial-Engine-Prognostics 14 . . . 3 pages.

(56) References Cited

OTHER PUBLICATIONS

Wood, "*Perspective on Controls & Diagnostics*," NASA Glenn Research Center, 2009 Propulsion Control and Diagnostics Workshop, Dec. 2009, 10 pages.

Simon, Integrated Vehicle Health Management, "*Propulsion Gas Path Health Management Task Overview*," Propulsion Control and Diagnostics Workshop, Dec. 2009, 29 pages.

Seemann, "*Modeling the Life Cycle Cost of Jet Engine Maintenance*," Technische Universitat Hamburg-Harburg, Institut fur Lufttransportsysteme, Oct. 2010, 107 pages.

Spellman, "*The Application of Spread Spectrum Datalinks to GPS-Based Air Traffic Navigation, Surveillance, and Control*," IEEE, 1994, pp. 194-198.

Tu, "*Wireless Ground Communication in Support of Aircraft Maintenance and Flight Operations*,"SAE Technical Paper Series, 951387, May 1995, 7 pages.

Donaldson et al., "*Economic Impact of Derated Climb on Large Commercial Engines*,"2007 Boeing Performance and Flight Operations Engineering Conference, 14 pages.

Ackert, "*Engine Maintenance Concepts for Financiers*,"Version 1, Mar. 15, 2010, 30 pages.

Flight Operations Briefing Notes, Supplementary Techniques, Handling Engine Malfunctions, Airbus Customer Services, Cedex, France, Dec. 2006, 17 pages.

\* cited by examiner

| | |
|---|---:|
| ENGINES/AIRCRAFT | 2.25 |
| WORLDWIDE AIRCRAFT | 17,912 |
| WORLDWIDE ENGINES | 40,302 |
| U.S. AIRCRAFT | 8,142 |
| U.S. ENGINES | 18,320 |
| INTERNATIONAL AIRCRAFT | 9,770 |
| INTERNATIONAL ENGINES | 21,983 |

| AIRLINE REGISTRATION | AIRLINES | PAX (000) | RPKS (MILS) | FTKS (MILS) | EMPLOYEES | AIRCRAFT |
|---|---:|---:|---:|---:|---:|---:|
| AFRICA | 19 | 28,086 | 56,502 | 1,431,040 | 58,701 | 361 |
| ASIA/PACIFIC | 76 | 371,947 | 729,798 | 45,914,252 | 396,799 | 2,496 |
| CANADA | 7 | 36,776 | 75,489 | 1,819,216 | 54,481 | 414 |
| EUROPE | 202 | 537,945 | 1,009,331 | 36,845,438 | 508,506 | 5,225 |
| LATIN AMERICA/CARIBBEAN | 49 | 92,248 | 135,796 | 5,146,300 | 90,227 | 901 |
| MIDDLE EAST | 20 | 47,143 | 86,542 | 3,953,035 | 72,765 | 373 |
| US MAJORS | 15 | 585,791 | 1,056,724 | 33,885,457 | 1,102,013 | 5,188 |
| US NATIONALS | 37 | 83,555 | 75,501 | 7,265,134 | 71,127 | 1,391 |
| US REGIONALS | 83 | 36,478 | 22,154 | 182,456 | 25,407 | 1,411 |
| US CARGO | 15 | N/A | N/A | 881,830 | 2,822 | 152 |
| TOTAL WORLD | 523 | 1,819,969 | 3,247,837 | 137,324,158 | 2,382,848 | 17,912 |
| TOTAL US | 150 | 705,824 | 1,154,379 | 42,214,877 | 1,201,369 | 8,142 |

WIRELESS ENGINE MONITORING SYSTEM WITH MULTIPLE HOP AIRCRAFT COMMUNICATIONS CAPABILITY AND ON-BOARD PROCESSING OF ENGINE DATA

RELATED APPLICATION

This application is a divisional application of Ser. No. 13/489,642 filed Jun. 6, 2012, the disclosure which is hereby incorporated by reference in its entirety.

FIELD OF THE INVENTION

This invention relates to real-time monitoring of aircraft engines, and more particularly, this invention relates to systems and related methods for determining an aircraft engine's current performance by collecting real-time aircraft engine data and processing the engine data for engine maintenance or other analysis.

BACKGROUND OF THE INVENTION

Harris Corporation of Melbourne, Fla. has designed a system and method of recording performance of an aircraft engine using a ground data link unit that interfaces with numerous components of the aircraft, including the Digital Flight Data Acquisition Unit (DFDAU), the aircraft Digital Flight Data Recorder (DFDR), and the data multiplexing system commonly referred to as the Full Authority Digital Engine Control (FADEC) for larger jet turbine engines or the Engine Control Unit (ECU) as sometimes referred to with smaller jet turbine engines used on smaller aircraft, including turboprops or other engines generating less than 15,000 pounds of thrust. The term "FADEC/ECU" can be used corresponding to either the term "FADEC" or "ECU" as used by the industry.

An example of this ground data link unit is disclosed in commonly assigned U.S. Pat. No. 6,047,165, the disclosure which is hereby incorporated by reference in its entirety. An engine monitoring system using this ground data link unit is disclosed in commonly assigned U.S. Pat. Nos. 6,148,179 and 6,353,734, the disclosures which are hereby incorporated by reference in their entirety.

In the incorporated by reference '179 and '734 patents, the system and method as disclosed can provide a record of the performance of an aircraft engine by collecting engine data during engine operation, for example, in the ground data link unit, and downloading the collected engine data over a wideband spread spectrum communications signal to a ground based spread spectrum receiver. The signal is demodulated within a ground based spread spectrum receiver to obtain the engine data for further processing. It is also possible to upload data to the ground data link unit, such as algorithms, flight management files, video and entertainment files and other data files.

This Harris Corporation ground data link (GDL) unit is advantageous over prior art systems that took a "snapshot" of basic engine parameters, for example, when the aircraft had lifted to 1,000 feet after initial take-off. The data was limited to one snapshot during flight and was not real-time. These prior art data "snapshots" did not go beyond gross indicators and reactive maintenance techniques. The "snapshots" typically may contain data regarding limited engine parameters (e.g., N1, N2, EGT and $W_f$) in which the "snapshot" data was recorded either "on board" or downloaded via ACARS using a VHF communication data link. Other monitoring systems required the pilot to enter data manually into a logbook or required removable media such as flash drives and Quick Access Recorders (QAR).

The ground data link unit system disclosed in the incorporated by reference '165, '179 and '734 patents overcomes the drawbacks associated with the prior art "snapshot," which never gave a true and complete and full flight indication of engine performance during flight of the aircraft. Also, these non-GDL prior art monitoring systems as described not only had data collection of limited value, but also had a high cost for retrieving what may or may not have been the full flight engine data from the aircraft because of limited communication options, for example, limited frequencies and narrow bandwidth/spectrum available from the FCC at the aeronautical frequency spectrum. The overly large engine data files required high bandwidth, e.g., about 10 kbps up to about 36 MB/FLT HR (without compression), which those non-GDL systems could not deliver.

Although the ground data link unit as disclosed in the '165, '179 and '734 patents is a major improvement over prior art engine monitoring systems, the disclosed ground data link unit is typically a large unit installed on the aircraft and interfaces with many airborne systems as previously described. As a result, Harris Corporation developed a Wireless Engine Monitoring System (WEMS) module that monitors aircraft engines in real-time without resorting to the larger ground data link unit that interfaces with many aircraft systems. The WEMS module is disclosed in commonly assigned U.S. Pat. Nos. 6,943,699; 7,456,756; 7,595,739; and 7,755,512, the disclosures which are hereby incorporated by reference in their entirety.

The WEMS module is an engine monitoring module mounted directly on the aircraft engine. It is not installed in the avionics compartment or similar fuselage location, for example, which on the other hand, is the preferred location for the ground data link unit that connects to many airborne units. The WEMS module is interfaced in one example to the Full Authority Digital Engine Controller (FADEC)/Engine Control Unit (ECU) on the engine. The WEMS module is typically small, in one example, about 2×2×4 inches, and can record, store, encrypt and transmit "full flight" engine data. The WEMS module interfaces directly to the FADEC/ECU and records hundreds of engine parameters, for example, with a one second or less sampling frequency. It has a preferred conformal antenna and RF transceiver to download (and upload) data using RF/802.11/cellular techniques, including other spread spectrum techniques as non-limiting examples.

This collection and storage of "full flight" engine data using the WEMS module allows advanced prognostics and diagnostics on the engine and increases engine "time-on-wing" (TOW) and decreases engine maintenance cost per hour (MCPH). The WEMS data is downloaded in one example using a RF/(802.11) spread spectrum/cellular signal to an airport server for processing and/or transported over the internet, PSTN, cellular or other communications network to another workstation for post flight analysis. Data can also be uploaded to the WEMS module, including algorithms for on-board processing. The WEMS module provides an automated wireless solution installed directly on the engine, recording full flight engine data for both large and small turbine engines in large megabyte files and using a high speed data link to extract.

Although the WEMS module operates as an archival data store for full flight engine data, it would be desirable to provide the capability to download in "real-time" significant quantities of engine data during flight and interface with the communications resources commonly available on most international flights. Additionally, it would be desirable to use the WEMS module in a cost effective method to detect and diagnose problems with the most mechanically stressed components within a turbine unit of an aircraft engine. This would require precise monitoring of the rotating subsystems such as the turbine blades and bearing assemblies and gas path parameters such as temperature, vibration, strain and pressure, but would also allow early detection and diagnosis of turbine component faults and help prevent catastrophic failures. There are about forty thousand jet engines worldwide that could be monitored to determine full flight engine data. Thus, to monitor the full flight engine data would increase the efficiency and safety of the engine data.

SUMMARY OF THE INVENTION

In accordance with a non-limiting example, a monitoring system for an aircraft engine includes an engine monitoring module comprising a housing configured to be mounted on the aircraft engine and a first wireless transmitter carried by the housing. A memory is carried by the housing and a processor is carried by the housing and coupled to the memory and the first wireless transmitter and configured to collect and store in the memory engine data relating to at least one engine parameter sensed during operation of the aircraft engine by a plurality of engine sensors that transmit the engine data via the first wireless transmitter. A wireless receiver is located within the aircraft and configured to receive the engine data transmitted from the first wireless transmitter. A second wireless transmitter is located within the aircraft and operatively connected to the wireless receiver and configured to receive and transmit the engine data.

In one example, the second wireless transmitter comprises a UHF transmitter configured to transmit the engine data over an air-to-ground communications signal. The second wireless transmitter in another example is configured to transmit the engine data over a satellite communications link. The first wireless transmitter in another example is configured to transmit the engine data and a data address linked to an identifier of the aircraft engine. A wireless Local Area Network (LAN) is formed within the aircraft to which the wireless receiver and second wireless transmitter are connected. In yet another example, a processor is located on the aircraft and configured to receive the engine data during the flight of the aircraft and process the engine data and determine engine operating parameters. Engine operating parameters can be determined based on the sensed engine data. In one example, an engine operating parameter includes a decision for an engine shut down during flight of the aircraft.

BRIEF DESCRIPTION OF THE DRAWINGS

Other objects, features and advantages of the present invention will become apparent from the detailed description of the invention which follows, when considered in light of the accompanying drawings.

FIG. 1 is a partial fragmentary, isometric view of a jet engine showing the FADEC/ECU and the WEMS module mounted on the engine, the WEMS module interfacing with the FADEC/ECU for downloading engine monitoring data such as disclosed in the commonly assigned and incorporated by reference '699, '756, '739 and '512 patents.

FIG. 2 is a block diagram showing the aircraft engine and aircraft, and the WEMS module of FIG. 1 interfaced with the FADEC/ECU for downloading full flight engine data files and uploading algorithms and other data.

FIG. 3 is a fragmentary, block diagram showing WEMS engine data that can be downloaded to an airport server and transferred by PSTN, internet or cellular infrastructure to a real-time analysis workstation or other processor.

FIG. 4 is a block diagram showing basic elements of a ground data link (GDL) unit as disclosed in the commonly assigned '165, '179 and '734 patents and showing a WEMS module interfaced with the GDL unit.

FIG. 5 is a block diagram showing basic components of a WEMS module as disclosed in the '699, '756, '739 and '512 patents.

FIG. 6 is a cross-section of an example of a jet engine that generates engine events to be collected, stored and transmitted from the WEMS module.

FIG. 7 is a chart showing various jet engine event reports at engine start and during flight that could be monitored by the WEMS module.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The wireless engine monitoring system (WEMS) as disclosed in the incorporated by reference '699, '756, '739 and '512 patents collects full flight engine data and is configured in one example to interoperate with basic components of the ground data link (GDL) unit as disclosed in the incorporated by reference '165, '179 and '734 patents. The WEMS module is mounted directly to the jet engine and preferably interfaces with the FADEC/ECU, and downloads data using a wireless communications signal, preferably a wideband spread spectrum communications signal, in a similar manner to the wireless ground link-based aircraft data communications system disclosed in the '165, '179 and '734 patents. The WEMS module could also download via any RF connection.

For purposes of technical understanding, the description of the WEMS module as set forth in the '699, '756, '739 and '512 patents is described relative to FIGS. 1-7, followed by a more detailed explanation of the WEMS module relative to its multiple-hop communications, use with an Engine Wireless Sensor Network (EWSN) and wireless sensor sampling.

Figure 1:
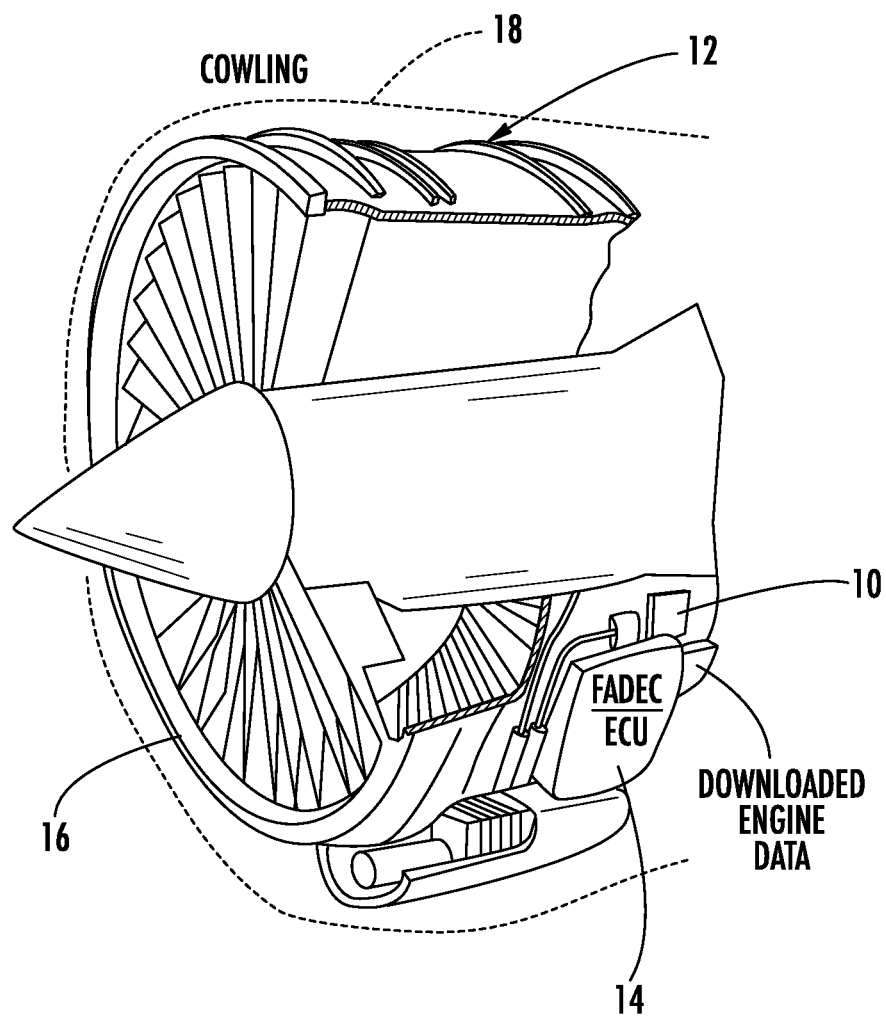
FIGS. 1-7 are views of the WEMS module and associated components as described in the incorporated by reference and commonly assigned '699, '756, '739 and '512 patents. A description of the WEMS module is given relative to FIGS. 1-7 followed by further details of the WEMS module used for multiple hop communications, including its use with an Engine Wireless Sensor Network (EWSN) and sampling wireless engine sensors at different rates in accordance with a non-limiting example of the present invention.

FIG. 1 shows a WEMS module 10 that is mounted directly on the jet engine 12 and electrically connected to the FADEC/ECU control unit 14, which is also mounted on the jet engine. The jet engine 12 shows basic elements of the turbine 16 and other components. The jet engine cowling/nacelle 18 is shown in dashed lines and WEMS module 10 is disposed within the cowling. The WEMS module 10 includes basic functional RF and memory components, such as disclosed in the ground data link unit of the '165, '179 and '734 patents. The WEMS module can be mounted at different locations on the engine depending on the type of preferred conformal antenna and the nature of the cowling 18 used in the jet engine.

Figure 2:
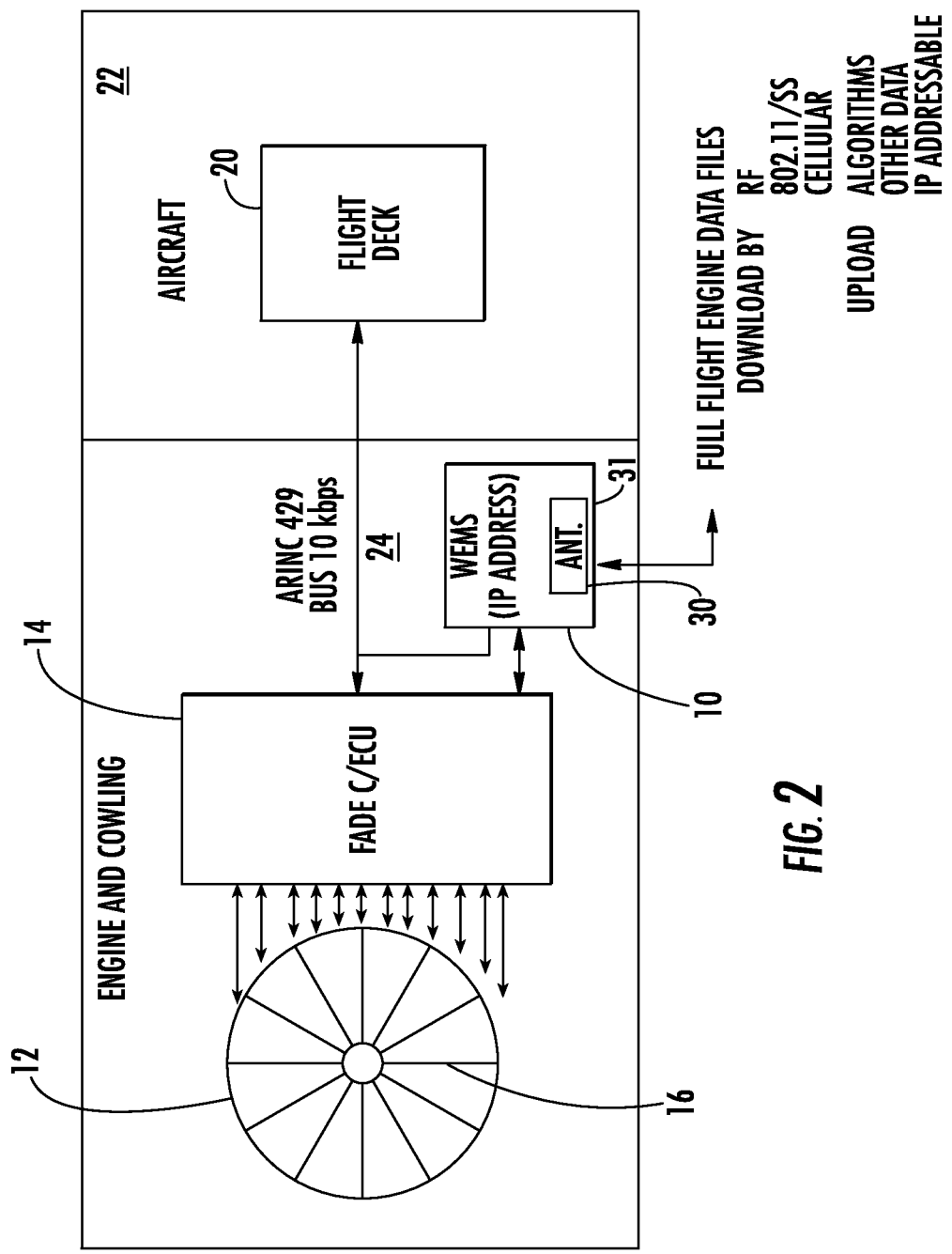

FIG. 2 shows a basic block diagram of a FADEC/ECU 14 that is operative as a bidirectional multiplexer for signals to and from the jet engine 12. The signals include analog and digital signals and the FADEC/ECU 14 gives commands to the engine from the flight deck 20 of the aircraft 22. It also transmits engine status and health signals. Many signals are processed by the FADEC/ECU 14, which then transmits the signals over an ARINC 429 bus 24 in this non-limiting example at typically 10 kilobits per second to and from the flight deck 20.

The WEMS module 10 in one example includes a separate data address as an IP address (for each module), which is linked to the serial number of the engine. The WEMS module is mounted on the engine and interfaces with the FADEC/ECU such as through another port on the FADEC/ECU or directly into the ARINC 429 bus 24. The radio frequency transceiver capability is built into the WEMS module and is operative for recording, compressing and encrypting full flight data files. It typically will use a conformal antenna 30 that is formed in one example as a small patch antenna the size of a postage stamp, for example, mounted on a casing 31 that forms a protective housing for the WEMS module 10. Although a conformal antenna is preferred, a separate antenna could possibly be used depending on the cowling and engine type on which the WEMS module 10 is mounted. A separate antenna could be mounted on a separate location on the fuselage or other location for enhancing communication.

The WEMS module 10 can use an archival data store for recording, storing and encrypting and then later transmitting "full flight" engine data. The WEMS module 10 as described in the incorporated by reference '699, '756, '739 and '512 patents can record hundreds of engine parameters with a preferred one second sampling frequency in one example. The WEMS module thus allows advanced prognostic and diagnostic techniques to increase engine "time on wing" (TOW) and decrease engine maintenance costs. For example, the WEMS module 10 could be operative with jet engine diagnostic cells, such as used with prognostic and health management applications, including those designed by Impact Technologies, LLC of Rochester, N.Y. The WEMS module 10 can download engine data by almost any type of radio frequency signal, including spread spectrum modulation techniques. The WEMS module 10 could be operative with cellular, internet, or PSTN communication infrastructures to download full flight engine data files and upload algorithms or other data or programs. Each WEMS module will typically include a separate Internet Protocol (IP) address such that it can be separately addressable for identification and upload and download of data.

Figure 3:
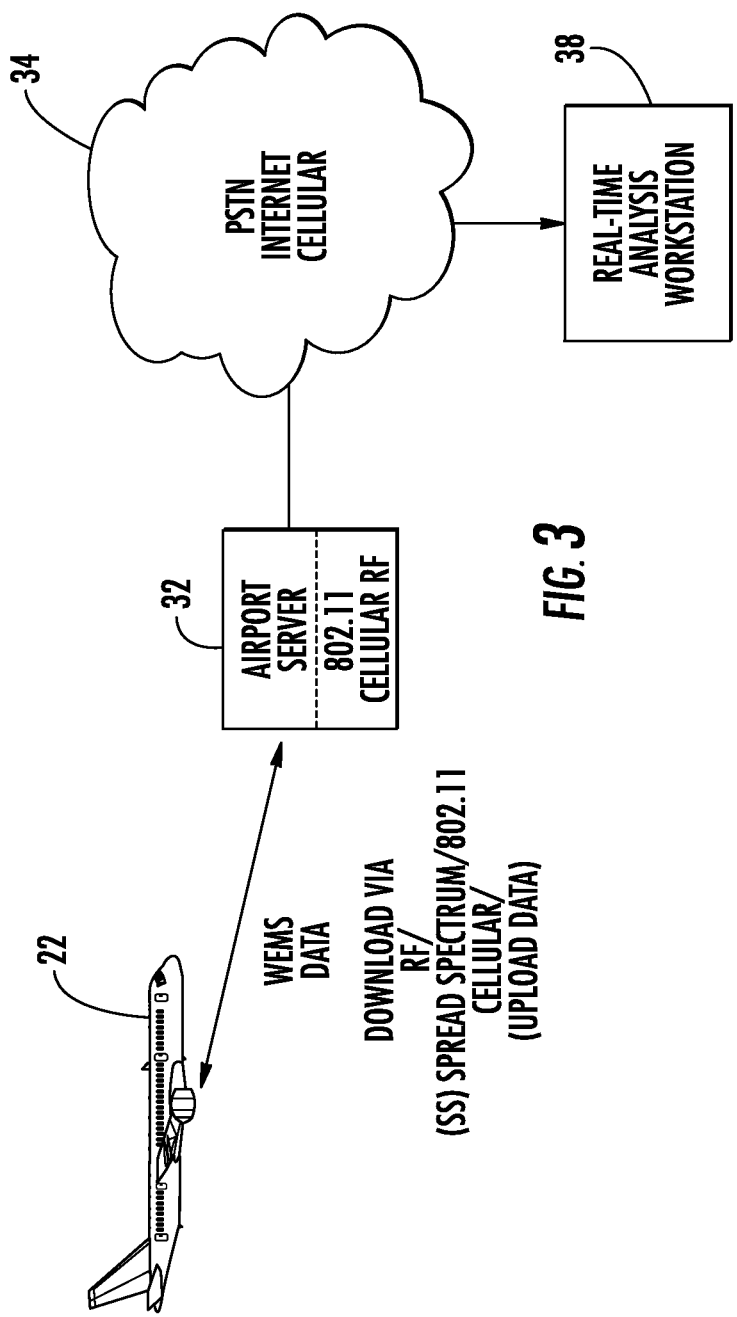

FIG. 3 shows a high level block diagram of an aircraft 22 that includes a WEMS module 10 as described in the '699, '756, '739 and '512 patents. The WEMS module 10 downloads engine data and uploads data for onboard processing to and/or from an airport server 32, which could be operative with a communications network 34, such as a public switched telephone network (PSTN), the internet or a cellular infrastructure. The airport server 32 includes a receiver and transmitter and communicates through the communications network 34 to a post flight analysis workstation, for example, as provided by an engine service provider or other similar processor 38 where the engine data can be analyzed to determine the best maintenance program for an engine, and thus, extend the time the engine remains on the aircraft without removing the engine. The real-time analysis workstation 38 could be directly connected to the airport server or could receive data directly from the WEMS module 10.

As noted before, the WEMS module 10 can be operative similar to the ground data link unit in that it stores data and transmits the data using a preferred spread spectrum or other wireless communications signal. The WEMS module 10 is much smaller, however, and mounts directly onto the aircraft engine. It has fewer functions than the functions required by a large scale ground data link unit, which is operative with many aircraft components, including the DFDAU, DFDR and engine sensors.

Figure 4:
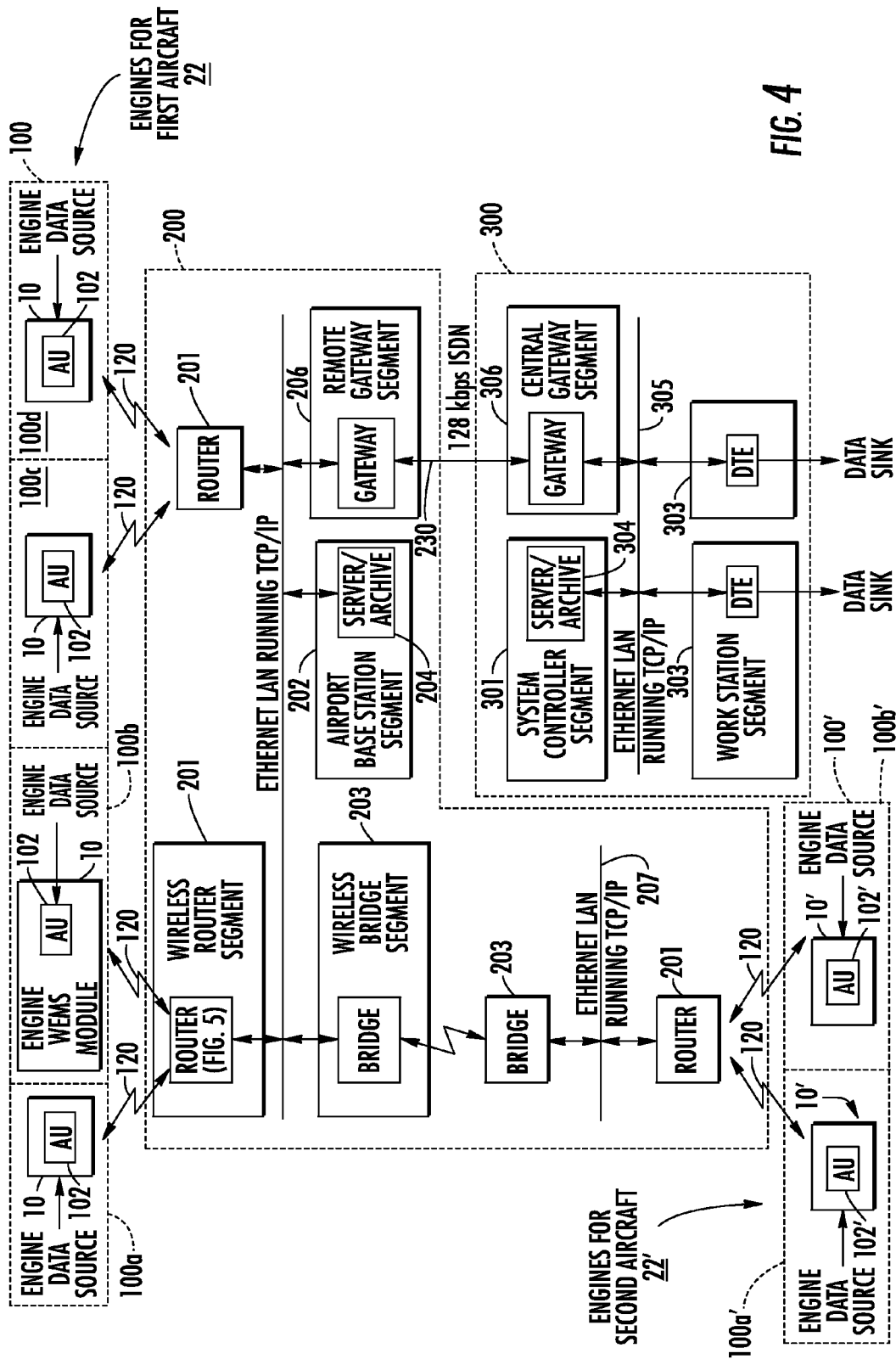

Referring now to FIG. 4, there is shown a representative example of an overall communications system architecture for a wireless spread spectrum data communications system that can be used with the WEMS module 10. The architecture in this example has three interlinked subsystems: (1) an engine WEMS subsystem 100; (2) a ground subsystem 200 (typically airport based but not necessarily at the airport); and (3) a remote engine data control center 300 used for analyzing any downloaded engine data. The WEMS system 100 for one aircraft 22 could include a plurality of WEMS modules 10, each installed on an engine 100a-d. Two aircraft 22 and 22' are illustrated each with respective WEMS modules 10, 10'. Each WEMS module 10, 10' includes an airborne unit (AU) 102, 102', each which includes the processor, transceiver, memory and other necessary components. Each WEMS module 10, 10' is operative to communicate with a wireless router (WR) segment 201 of the ground subsystem 200 through a wireless communications link 120. The following description proceeds with reference to one aircraft 22 and WEMS module 10 for purposes of description.

The wireless router segment 201 routes the engine data files it receives from the WEMS module 10, either directly to an airport base station 202 via a wired Ethernet LAN 207, or indirectly through local area networks 207 and airport-resident wireless bridge segments 203 in this one non-limiting example. The wireless communication link 120 can be a spread spectrum radio frequency (RF) link having a carrier frequency lying in an unlicensed portion of the electromagnetic spectrum, such as within the 2.4-2.5 GHz S-band as one non-limiting example. The wireless communication link 120 could also be an RF, Internet, cellular, or other link.

The ground subsystem 200 in this example includes a plurality of ground and/or airport-resident wireless router segments 201, one or more of which are distributed within the environments of the various airports served by the system. A respective ground and/or airport wireless router 201 is operative to receive engine data that is wirelessly down-linked from a WEMS module 10. Each ground subsystem wireless router 201 can forward engine data to a server/archive computer terminal 204 of a base station 202, which can reside on a local area network 207 of the ground subsystem 200 at an airport or other location.

The base station 202 can be coupled via a local communications path 207, to which a remote gateway (RG) segment 206 is interfaced over a communications path 230, to a central gateway (CG) segment 306 of a remote engine data control center 300, where engine data files from various aircraft are analyzed. As a non-limiting example, the communications path 230 can include an ISDN telephone company (Telco) land line, and the gateway segments can include standard LAN interfaces. Other communications networks, such as cellular, internet, or other wireless communications can be used. It should be observed that other communications media, such as a satellite links or cellular, for example, may be employed for ground subsystem-to-control center communications without departing from the scope of the invention.

The remote engine data control center 300 could include a system controller (SC) segment 301 and a plurality of workstations (WS) 303, which are interlinked to the systems controller 301 via a local area network 305. Engine safety, maintenance, and monitoring analysts are at the remote engine data control center 300 to evaluate the engine data files conveyed to the remote engine data control center 300 from the airport base station segments 202 of the ground subsystem 200. The respective workstations 303 may be allocated for different purposes.

The system controller 301 can have a server/archive terminal unit 304 that preferably includes database management software for providing for efficient transfer and analysis of engine data files, as it retrieves downloaded files from the ground subsystem. As a non-limiting example, such database management software may delete existing files from a base station segment's memory once the files have been retrieved.

Figure 5:
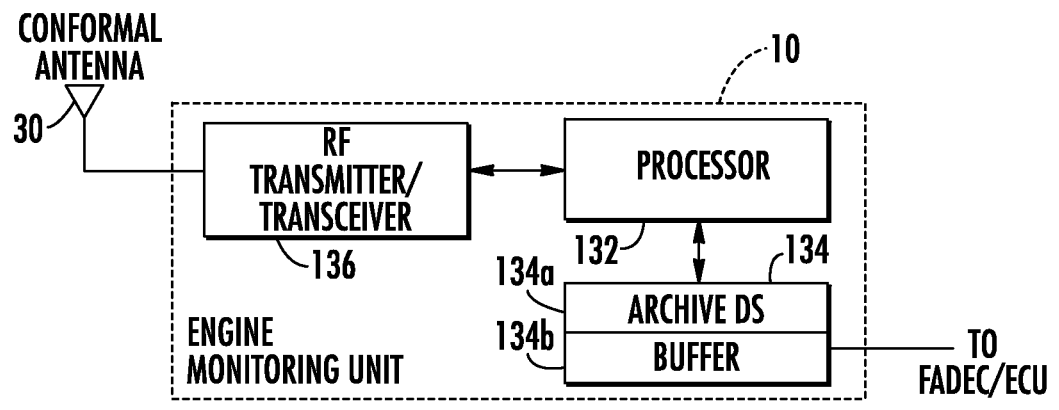

As described briefly above, and as diagrammatically illustrated in FIG. 5, each WEMS module 10 can include a housing and bidirectional wireless (radio frequency carrier-based) subsystem containing a processing unit such as a microprocessor 132 and associated memory or data store 134, serving as both an archival data store 134a and a buffer 134b for communications, including packet communications. The memory 134 is coupled to the FADEC/ECU. Processing unit 132 can receive and compress the engine data and store the compressed data in its associated memory 134. A report can be generated by the processing unit 132, which includes many items of engine data.

The engine data and reports can be downloaded via the RF transceiver 136 and its preferred conformal antenna 30. To provide bidirectional RF communication capability, the transceiver 136 is operative with the wireless router 201 for upload and download of data.

If the RF communication link is spread spectrum, and a preferred 802.11 link, each of a plurality of sub-band channels of an unlicensed 2.4-2.5 GHz S-band segment of interest in this non-limiting example can be available and preferably used. Other unlicensed or licensed bands could be used. A wireless router 201 could continuously broadcast an interrogation beacon that contains information representative of the emitted power level restrictions at an airport. Using an adaptive power unit within its transceiver, the WEMS module 10 could respond to this beacon signal by adjusting its emitted power to a level that will not exceed communication limitations imposed by the jurisdiction governing the airport. The wireless (RF) transceiver 136 then accesses the engine data file stored in memory 134, encrypts the engine data and transmits the engine data file via a selected sub-channel of the wireless ground communications link to a wireless router 201.

The recipient wireless router 201 forwards the data file to the base station segment temporarily until the file can be automatically transmitted over the communications path 230 to the remote engine data control center 300 for analysis. Further details of the associated components are described in the above-identified and incorporated by reference patents.

The wireless engine monitoring system (WEMS) as described in the '699, '756, '739 and '512 patents uses similar components as in the GM, unit described in the '165, '179 and '734 patents, but has reduced size and functionality for interfacing with the FADEC/ECU and mounting on the engine. The WEMS module is installed on the engine typically under the cowling and in a location to give the best antenna and transceiver functionality, but preferably adjacent or near the FADEC/ECU. It is possible to incorporate the WEMS module with the FADEC/ECU. The WEMS module records, stores, encrypts and transmits "full flight" engine data and in one example interfaces directly to the FADEC/ECU. It can record hundreds of engine parameters with one second sampling frequency as an example and is a miniaturized module with a conformal antenna. It acquires "full flight" engine data and allows advanced prognostics and diagnostics techniques either on-board or preferably at a remote workstation to increase engine "time on wing" and decrease engine maintenance costs. It is an automated wireless solution installed directly on the engine and records full flight engine data for large turbine engines and results in large megabyte files using the high speed data link as described before. It is an improvement over those systems that record only a few engine data "snapshots," resulting in limited data and limited analysis.

For purposes of reference, a jet engine is described with reference to FIGS. 6 and 7 on which the wireless engine monitoring system (WEMS) module 10 as described in the '699, '756, '739 and '512 patents can be used. Each engine can have one engine mounted WEMS module and each WEMS module can have a specific data address, such as an internet address or other IP address, to allow service providers to access the WEMS module and its data in near real-time and perform "intelligent" maintenance. This address is linked to the engine serial number and will be used to store routine and critical engine information. Use of the WEMS module can thus reduce engine maintenance cost per hour (MCPH).

Figure 6:
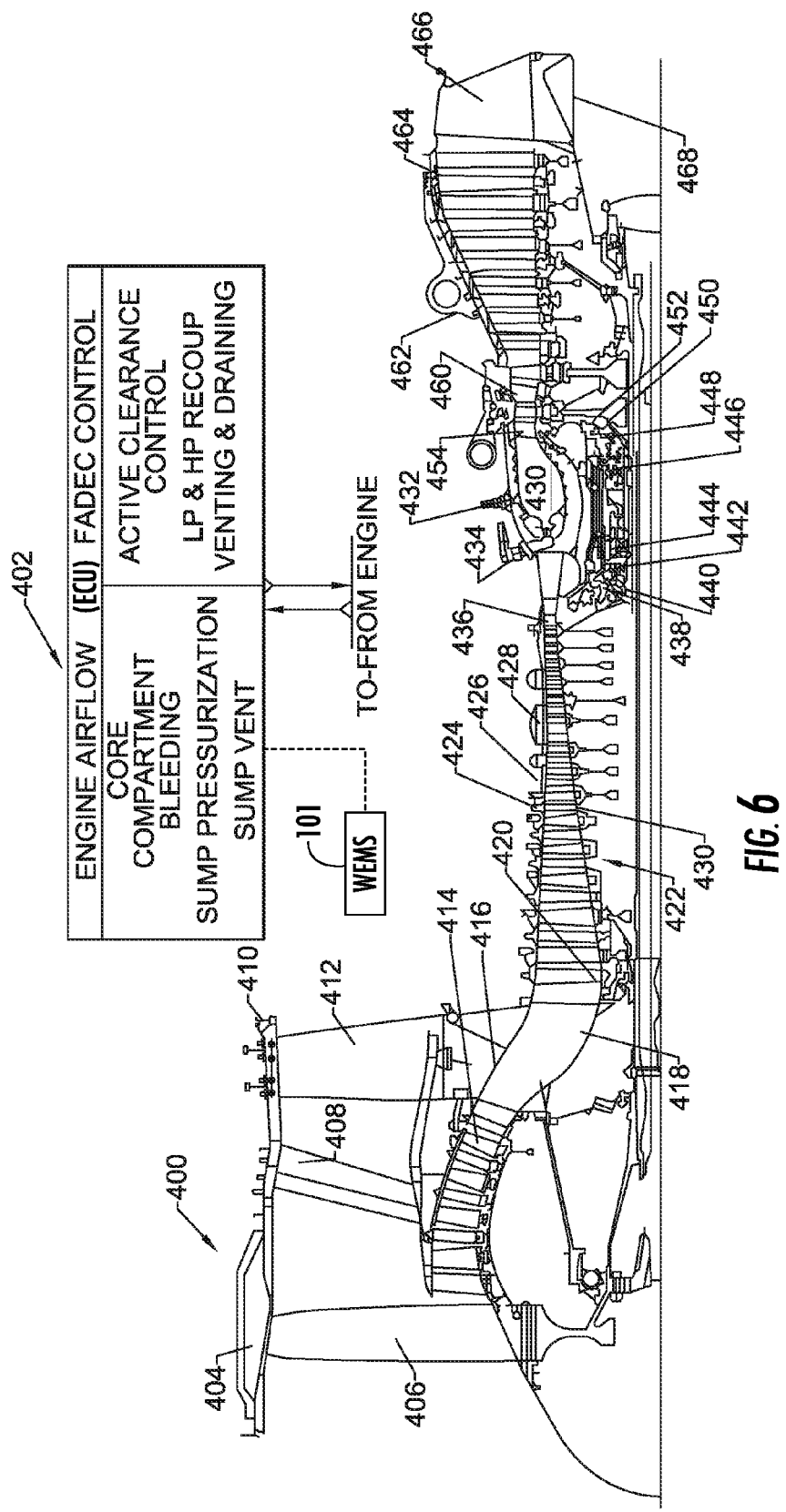

FIG. 6 illustrates one cross-section of a jet engine indicated generally at 400, showing basic components and engine air flow FADEC/ECU control 402 to and from the jet engine that can be used for real-time monitoring of engine events. These events could be downloaded during the first minute or so of initial take-off to a remote engine data control center 300 or saved to memory in the WEMS module and later downloaded to determine if "on wing" engine maintenance is warranted at the destination.

For purposes of clarity, reference numerals to describe this jet engine begin in the 400 series. As shown in FIG. 6, the engine air flow FADEC/ECU control 402 could include the core compartment bleeding; sump pressurization; sump venting; active clearance control; low pressure and high pressure recoup; and venting and draining functions. These functions could be monitored through basic FADEC/ECU control system 402, as known to those skilled in the art. The engine example in FIG. 6 corresponds to a General Electric CF6-80C2 advanced design with a FADEC/ECU or PMC control having an N1 thrust management and common turbo machinery. Although this jet engine is illustrated, naturally other control systems for different jet engines could be used, as known to those skilled in the art.

The engine as illustrated has six variable stages and a ruggedized stage one blade with a low emission combuster and 30 pressurized nozzles and improved emissions. It has a Kevlar containment to give a lower containment weight and a composite fan outer guide vane. It has an enhanced High Pressure Turbine (HPT) with a stage of one blade material and advanced cooling and active clearance control.

The fan module includes an aluminum/Kevlar containment 404 and a 93-inch improved aero/blade 406. It has compositive outer guide vanes 408 with an aluminum/composite aft fan case 410 and a titanium fan frame 412 for reduced losses. It additionally has a four stage orthogonal booster 414 and a variable bypass valve (VBV) between the fan struts (with 12 locations) 416. The engine includes a compressor inlet temperature (CIT) probe 418.

The high pressure compressor includes an IGV shroud seal 420 and a blade dovetail sealing 422 with a trenched casing of stages 3-14 424. The compressor includes a vane platform sealing 426 and a short cord stage 8 low loss bleed system 428 and improved rubcoat reduced clearances 430.

The compressor rear frame includes a combuster 430 and ignitor plug 432 with a fuel nozzle 434 and outer guide vane 436. It includes a vent seal 438 and 4R/A/O seal 440 and 4R bearing 442 and 4B bearing 444. It also includes a 5R bearing 446 and 5R/A/O seal 448, a diffuser 450 and pressure balance seal 452. The compressor rear frame also includes a stage 1 nozzle 454.

The high pressure turbine area includes an active clearance for control stages 1 and 2, and coated shrouds indicated at 456. It also includes directionally solidified stage 1 blades and damped blades 458 and a cooling air delivery system. The high pressure turbine includes a thermally matched support structure, and an active clearance control and simplified impingement with a cradled vane support and linear ceiling. The improved inner structure load path has improved roundness control, solid shrouds and improved ceiling. These components are located in the area generally at 460 of the high pressure turbine area.

Low pressure turbine technology area includes a clearance control 462, a 360° case 464, aerodynamic struts 466 that remove swirl from the exit gas and a turbine rear frame 468 formed as a one piece casting.

Many of these components include sensors and structural force sensors that generate signals during initial take-off and throughout flight. Signals can be relayed via the WEMS module to an on-ground maintenance crew and/or separate remote engine data control center having its own processor and data analytics for advanced analysis.

Figure 7:
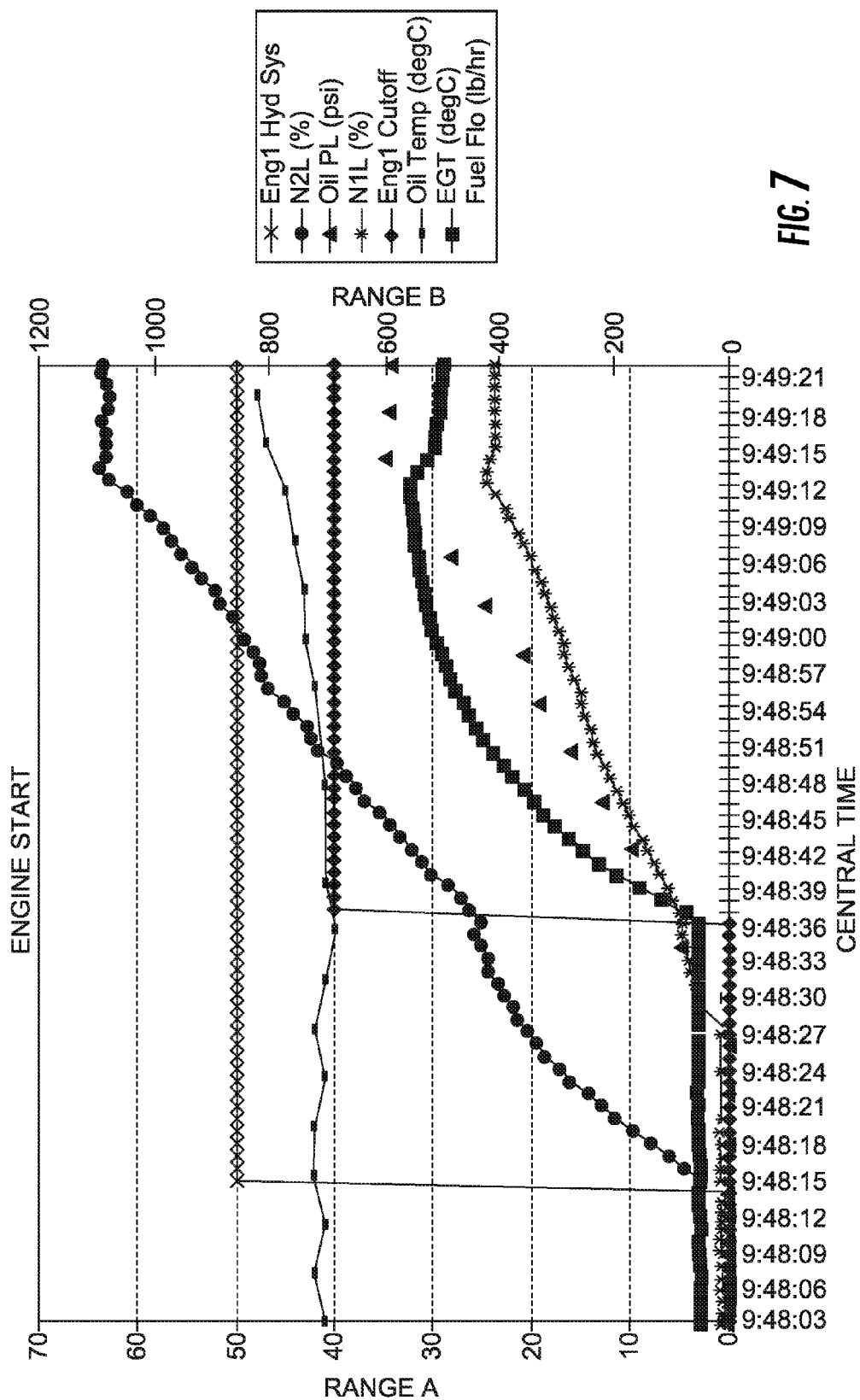

FIG. 7 illustrates components that were monitored during engine start in one example, including the engine hydraulic system, the oil pressure (psi), the engine cut-off switch, oil temperature (deg C.), fuel flow (lb/hr), the N2L and N1L both in percentage terms, oil temperature and EGT, both in centigrade, and $W_f$. Some of the ranges are shown on the vertical axis of the graph, while time is shown on the horizontal axis of the graph.

This information can be downloaded via the WEMS module to a ground based processor and a remote engine data control center can determine if on wing maintenance is warranted at the destination station.

There is now described relative to FIGS. 8-16 the WEMS module that can be used for multiple-hop communication capabilities, for use with an engine wireless sensor network (EWSN) and for sampling wireless engine sensors at different sampling rates. For purposes of description, reference numerals begin in the 500 series. The reference numerals for the WEMS module 10, jet engine 12, FADEC/ECU control unit 14, jet engine cowling 18, flight deck 20 at the cabin, aircraft 22, ARINC 429 bus 24, conformal antenna 30, and casing 31 (housing) remain the same throughout the description with similar reference numerals.

Figure 8:
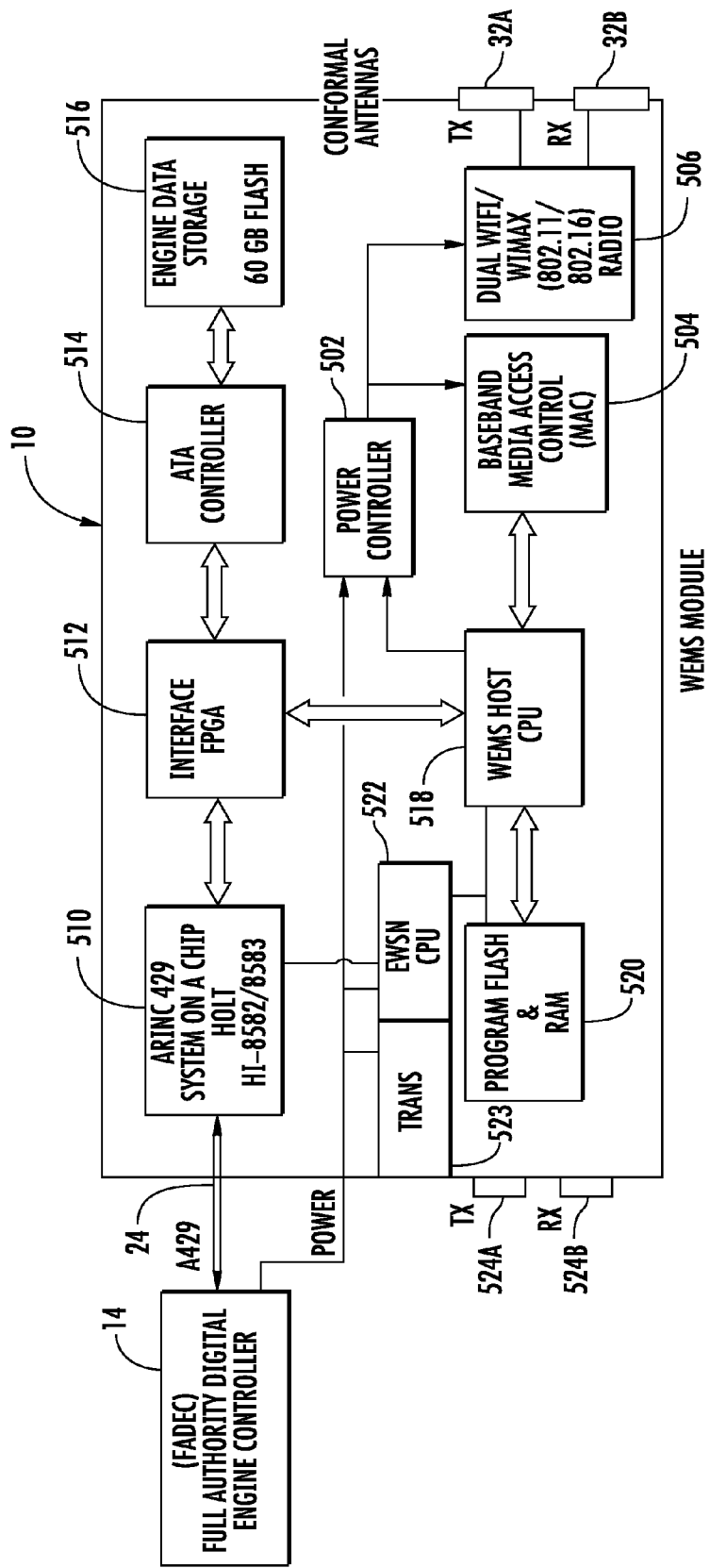
FIG. 8 is a block diagram of the WEMS module similar to that shown in FIG. 5 and showing greater details of various components in accordance with a non-limiting example of the present invention.

FIG. 8 is a block diagram of the WEMS module 10 similar to that shown in FIG. 5 and showing greater details of different components and subcomponents that can be used in accordance with a non-limiting example. The FADEC 14 interfaces with the WEMS module 10 and provides power to a power controller 502 in the WEMS module that interoperates with a baseband Media Access Control (MAC) circuit 504 and dual WiFi/WiMAX radio 506, which in turn operates as a transceiver in accordance with 802.11 and 802.16 standards. In one example, it is a first wireless transmitter that transmits to the flight data as explained later. This transceiver (radio) 506 could operate with other standards, however, to transmit and receive data through the conformal antennas, which in this example, correspond to a transmit (Tx) conformal antenna 32a and receive (Rx) conformal antenna 32b. The FADEC 14 communicates over the ARINC 429 bus 24 with a processor 510, which in this non-limiting example corresponds to a system on a chip (SOC) such as a Holt HI-8582/8583 integrated circuit chip. This chip interoperates with an interface Field Programmable Gate Array (FPGA) 512, which interoperates with an ATA controller 514 and engine data storage 516, for example, a 60 GB flash memory. The interface FPGA 512 interoperates with a processor as a WEMS host CPU 518, which in turn, interoperates with the program flash and RAM 520 and the baseband media access control circuit 504. An associated Engine Wireless Sensor Network (EWSN) Central Processing Unit (CPU) 522 and transceiver 523 can act as an interrogation unit and receiver for wireless network sensors as explained below. The transceiver (radio) 523 can transmit and receive data through conformal antennas, such as the example illustrated at transmit (Tx) conformal antenna 524a and receive (Rx) conformal antenna 524b.

In this system, no aircraft modification is required and no manual intervention is required after the WEMS module 10 is installed on the aircraft engine. As indicated below during flight, the WEMS module acquires, stores and encrypts "full flight engine data" and can automatically and wirelessly download engine data during flight or post-flight. In accordance with a non-limiting example of the present invention, the WEMS module 10 can acquire significant quantities of data during flight and provide global "real-time" downloading of that acquired engine data such as using a communications protocol in conformance with ARINC 429. This is a technical standard for the avionics data bus used on most higher-end commercial and transport aircraft as a two-wired data bus and data protocol to support an avionics local area network (LAN). It is a self-clocking and self-synchronizing serial data bus with a transmit and receive on separate ports. The twisted pair wires provide for balanced differential communications signaling.

Each ARINC communications packet typically has a 32-bit value and five fields, including a parity bit, a sign/status matrix (SSM) to indicate whether a data field is valid, a normal operation (NO) to indicate that data in the word is considered to be correct data; a functional test (FT) to indicate that data is provided by a test source; a failure warning (FW) to indicate a failure that causes the data to be suspect or missing; and a no computed data (NCD) to indicate that data is missing or inaccurate. The SSM as a sign/status matrix can indicate the sign of the data or other orientation such as north/south or east/west. The ARINC 429 system on a chip circuit 510 such as the Holt integrated circuits HI-8582 or HI-6583 is a silicon gate CMOS device that interfaces a 16-bit parallel data bus directly to the ARINC 429 serial bus 24. The ARINC 429 processor 510 includes two receivers each with label recognition, 32×32 FIFO and an analog line receiver. Up to 16 labels can be programmed for each receiver.

Figure 9:
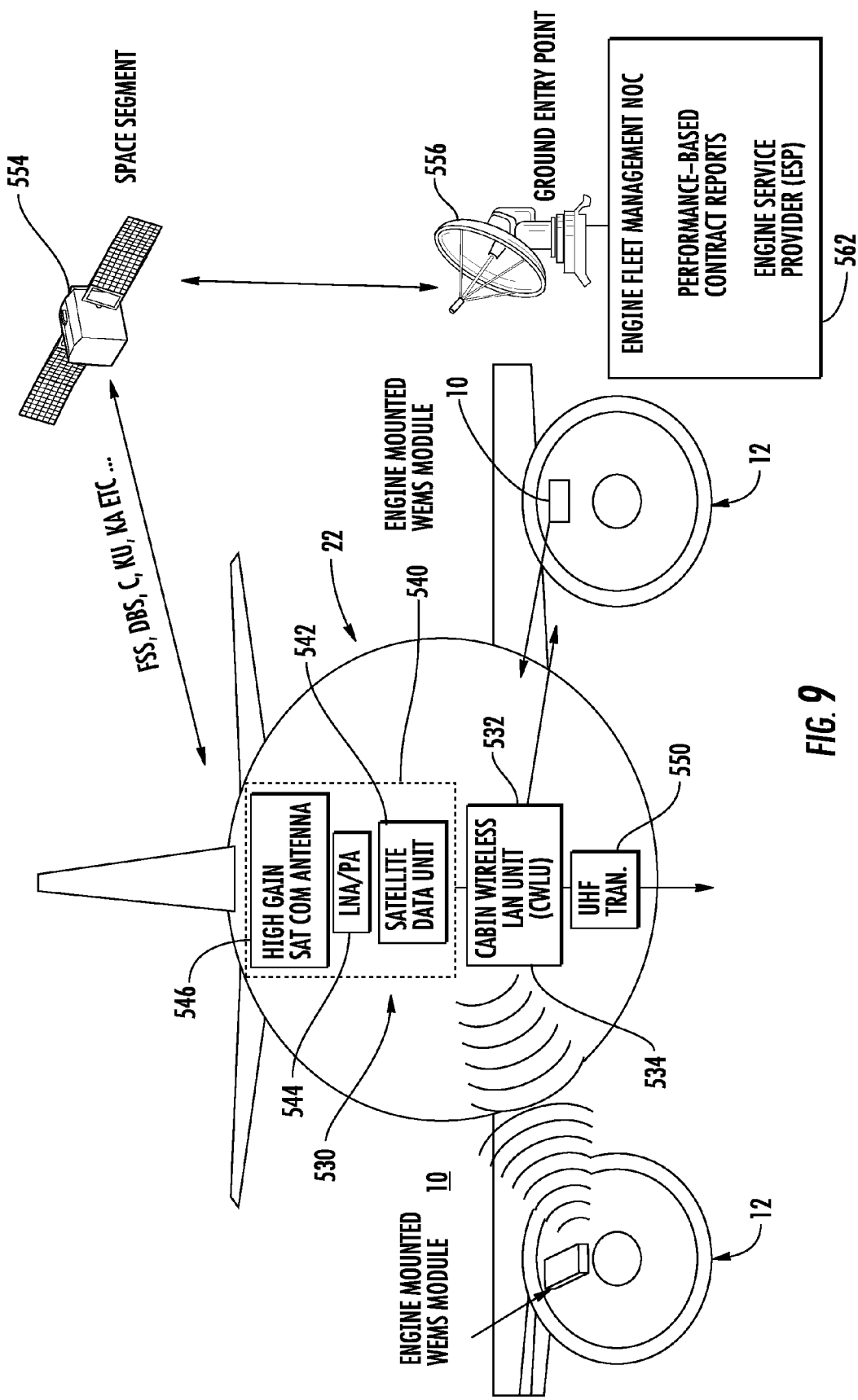
FIG. 9 is a partial fragmentary view of an aircraft and its engines and showing an engine mounted WEMS module that wirelessly communicates its data to a cabin wireless LAN unit in a first communications "hop" and then communicates data through a satellite communications link (or by UHF) in a second communications "hop" to an engine service provider (ESP) in accordance with a non-limiting example of the present invention.

FIG. 9 illustrates a fragmentary sectional view of an aircraft 22 and two aircraft engines 12, each having an engine mounted WEMS module 10 in accordance with a non-limiting example of the present invention. The aircraft 22 includes the flight deck 530 having a cabin wireless LAN unit (CWLU) 532 that operates as a wireless access point and receives communication signals from the WEMS module 10. The CWLU 532 interoperates with a satellite communications unit 540 that includes a satellite data unit 542, a low noise amplifier/power amplifier (LNA/PA) 544 and high gain satellite communications antenna 546. These components form a second wireless transmitter for a satellite communications link. The CWLU 532 also interoperates with a UHF transceiver 550 that can be used for air-to-ground communications such as the older Air-to-Ground Radiotelephone bands used on aircraft. The UHF transceiver also operates as a second wireless transmitter. Multiple hop communications is illustrated using the WEMS module 10, CWLU 532, and a satellite 554, which communicates with a ground entry point 556 user satellite dish such as a satellite receiving dish that receives data for an engine service provider (ESP) 562. During flight, the WEMS module wireless connects to the cabin wireless LAN unit 532 and can download critical "in flight engine safety data" to the ESP 562 or have an on-board processor analyze the data. This data can support FAA ETOPS (Extended Twin Operations) for oceanic routes. The satellite communication link provides "real-time" engine data transfers and supports critical engine decisions at the ESP or on-board, including "in flight engine shut downs" to determine if one of the engines should be shut down. Real-time analysis of aircraft engine data can be accomplished at the engine service provider 562, including performance-based contract reports for engine diagnostics, health and status of an aircraft engine, performance burns, time on wing and the environmental impact (carbon emissions) or on-board the aircraft. Satellite communications can include different communications signaling and protocols, including Direct Broadcast Satellite (DBS), the Fixed Satellite Service (FSS), Ku, Ka and C band communications.

Alternatively, the UHF transceiver 550 can be used for communications at 848-850 MHz and 894-896 MHz as part of the older telephone band that can connect to the terrestrial ground system. The system as shown in FIGS. 8 and 9 allows significant "high value" and "time critical" data to be downloaded during flight and provides global "real-time" downloading of engine data. The WEMS module 10 interfaces with resources commonly available on international flights, including the WiFi cabin wireless LAN unit 532 in accordance with non-limiting examples operating under the ARINC 763 standard, which applies to servers on board commercial aircraft, allowing a passenger to have an "office in the sky." Access can be provided to the airborne satellite communications that operate in accordance with the ARINC 741 standard using the satellite data unit 542 and other components as described. Airlines can now more closely monitor aircraft engine performance including meeting IAW ETOPS certification requirements that apply to twin engine aircraft on routes with diversion times more than 60 minutes using one engine and applies on routes with diversion times more than 180 minutes for airplanes with more than two engines. ETOPS is the acronym for Extended Twin Operations as defined by the U.S. Federal Aviation Administration (FAA) and allows the twin-engine airliners such as an AirBus A300 or Boeing 737 and up to Boeing 787 to fly the long distance routes that were previously off-limits to twin-engine aircraft.

The WEMS data as real-time aircraft engine data allows a flight crew to make a decision to do an in-flight check-up and if necessary shut down or adjust the engine thrust of an engine. Algorithms can be programmed into the WEMS module or a processor at the flight deck or at a ground based ESP to provide the processing to determine engine operating parameters based on the sensed engine data and determine if an in-flight shutdown should occur if certain engine operating parameters have been exceeded. Algorithms can be uploaded to the WEMS module even during flight, allowing the WEMS module to be configurable "on-the-fly." It is also possible to populate a request from the flight deck to the WEMS module as to what exceedances are to be investigated and processed depending on environmental or other conditions. For example, it is possible to configure the WEMS module to download only specific monitored parameters and data during flight instead of downloading a large amount of data. The WEMS module is thus configurable as to data collection, storage and transmission. The WEMS module is configurable and can be programmed by the flight deck or ESP. For example, if vibration occurs during flight, it is possible to increase the sampling frequency for various vibration sensors, while reducing the sampling frequency of other sensors such that more data is collected during flight concerning vibration statistics.

Figures 10, 11, 12:
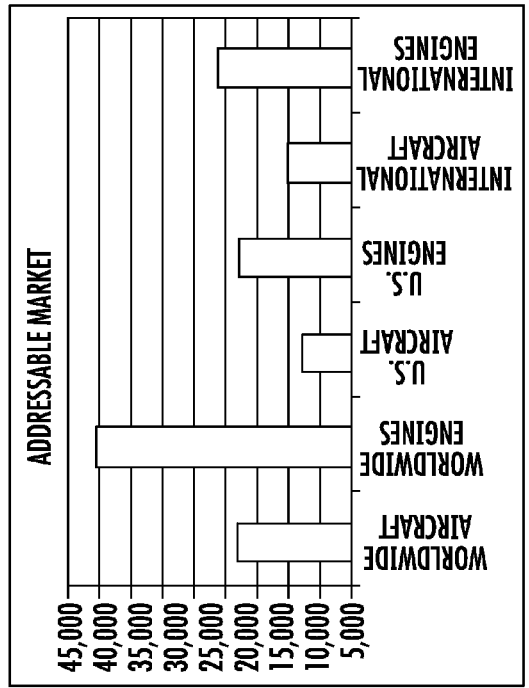
FIGS. 10-12 are charts showing the market for aircraft engines that can support use of the WEMS module in accordance with a non-limiting example of the present invention.

FIGS. 10-12 show graphs and statistics for the number of aircraft engines worldwide that can use the WEMS module as described. This data gives an example of the relevant market for the WEMS technology.

The WEMS module in one example operates in accordance with the IEEE 802.11 or IEEE 802.16 standards and is implemented with a Wireless Local Area Network (WLAN) 530 at a preferred 2.4 GHz frequency band. It also operates in the 3.6 and 5.0 GHz frequency bands. Over-the-air modulation techniques use the same basic protocol such as defined in the 802.11b and 8011 g protocols, typically using the 2.4 GHz ISM band, which divides each of the various bands into channels. For example, the 2.4000 through 2.4835 GHz band is divided into 13 channels that are spaced 5 MHz apart, with availability of the channels often regulated by each country. Thus, depending on worldwide geographical location of the aircraft, the WEMS unit can communicate via its radio 506 on different channels and at different powers depending on jurisdictional requirements at the specific locale. Some of the channels can also overlap depending on local requirements. The data frames are typically divided into specific, standardized sections, which include a MAC header, payload, and frame check sequence (FCS). Different MAC headers and frame control fields can be used and subdivided into various subfields. These may be modified depending on the geographical location of the aircraft and local jurisdictional rule.

The 802.16 is a wireless broadband standard for a wireless metropolitan area network as a wireless MAN, commercialized under the name "WiMAX" (Worldwide Interoperability for Microwave Access). WiMAX standardizes the air interface and related functions with the wireless local loop. It requires a physical device layer (PHY) and operates with scalable OFDMA (Orthogonal Frequency Division Multiple Access) to carry data and support channel bandwidth between about 1.25 MHz and 20 MHz with about 2,048 subcarriers. It supports adaptive modulation decoding and an efficient 64 QAM coding scheme. In some instances, 16 QAM and QPSK can be used. The WEMS module 10 and other associated components of the system may include Multiple-in, Multiple-out (MIMO) antennas to provide non-line-of-sight propagation (NOLS) characteristics for a higher bandwidth and a hybrid automatic repeat request (HARQ) for good error performance. The MAC sublayer can include a number of convergent sublayers that describe how the wire line technology such as Ethernet, Asynchronous Transfer Mode (ATM) and Internet protocol (IP) are encapsulated on the air interface and how data is classified. The advanced Encryption Standard (AES) or Data Encryption Standard (DES) can be used during data transfer for higher security. Various power saving mechanisms can be used, including a sleep or idle mode. The quality of service (QOS) can be supported by allocating each connection between a subscriber station and base station.

Figure 13:
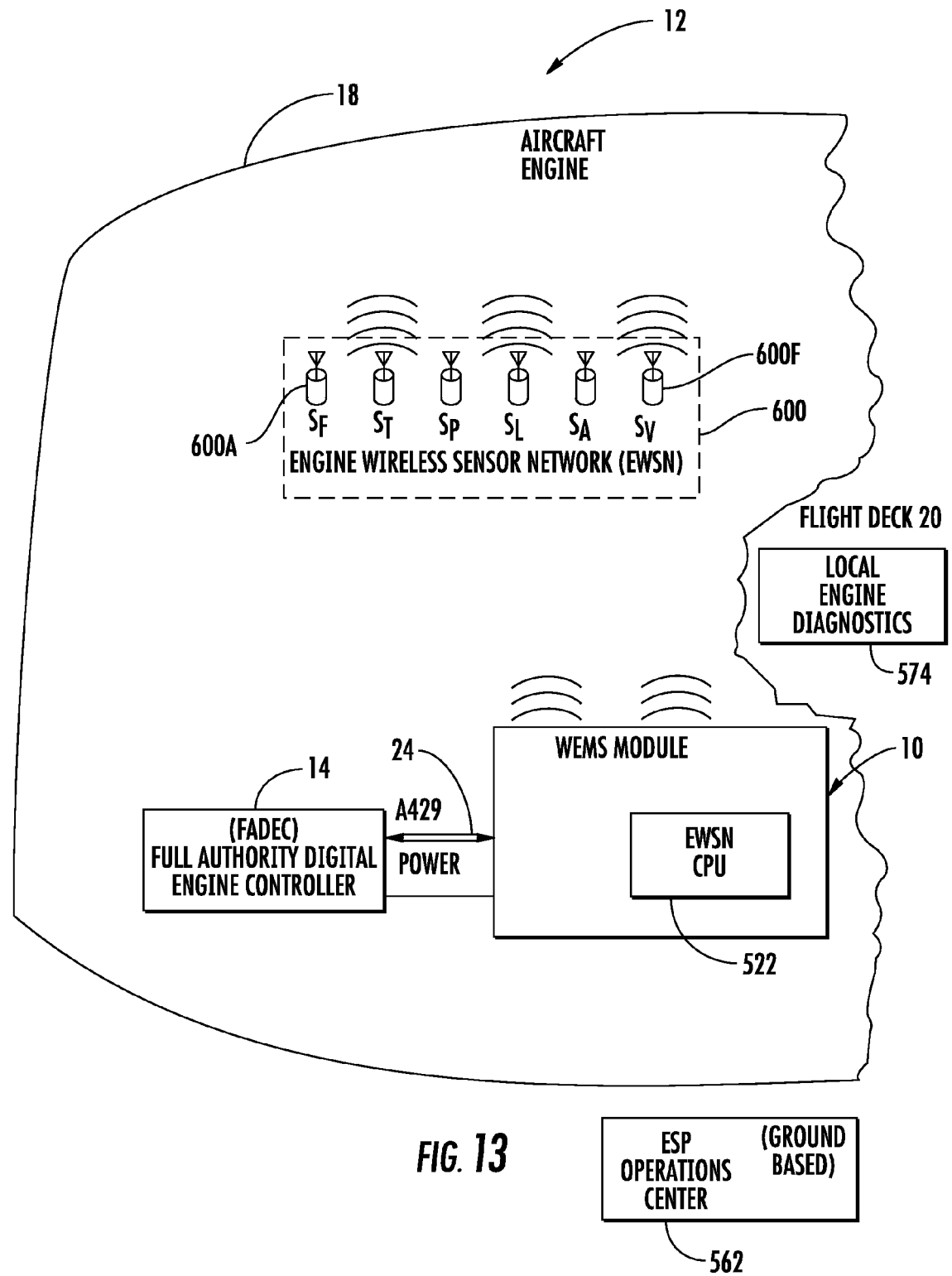
FIG. 13 is a block diagram showing a WEMS module that interoperates with an Engine Wireless Sensor Network (EWSN) and Engine Service Provider (ESP) operations center in accordance with a non-limiting example of the present invention.

FIG. 13 illustrates how the WEMS module 10 can interoperate in a wireless connection with an existing Engine Wireless Sensor Network (EWSN) 600 that is formed by a plurality of different wireless engine sensors illustrated in this example as individual nodes 600a-f, to provide precise monitoring of the rotating subsystem such as the turbine blades and bearing assemblies in the aircraft engine, and gas path parameters such as temperature, vibration, strain and pressure. Although only six wireless engine sensors are illustrated, it should be understood that the engine wireless sensor network for one jet aircraft engine can include at a minimum hundreds of such wireless engine sensors. A separate EWSN CPU 522 (corresponding to the EWSN CPU in FIG. 8) at the WEMS module 10 can interoperate with the engine data received from different wireless engine sensors for communications and the sensor processor can configure the wireless sensors forming the EWSN to change sampling rates and interrogate sensors through an appropriate wireless transceiver that interoperates with each of the wireless engine sensors. The engine data received from the wireless engine sensors can be processed as explained above and aircraft components adjusted through the FADEC.

The WEMS module 10 not only interfaces to the FADEC 14 as illustrated in FIG. 13, but also to the wireless engine sensors that are configured to form the EWSN 600 and monitor the critical engine parameters. The EWSN topology can vary from a simple star network to an advanced, multiple hop wireless mesh network. Propagation between the hops and the network can be by routing or flooding. As shown in FIG. 13, various wireless engine sensors include a fuel flow sensor ($S_F$); temperature sensor ($S_T$); pressure sensor ($S_P$); level sensor ($S_L$); acceleration sensor ($S_A$); and vibration sensor ($S_V$). Each of the wireless engine sensors can include various transducers that are bidirectional and provide engine control. Each wireless engine sensor forms a wireless node that typically includes a sensing mechanism and includes a radio transceiver and antenna and a microcontroller (processor) and associated software and an energy (or power) source. This allows real-time detection and diagnosis for faults that can be alerted to a pilot.

The EWSN 600 interoperates with the WEMS module 10 and provides a cost effective method to monitor, detect and diagnose problems and targets mechanically stressed components within a turbine unit or other component of the engine. Use of the EWSN 600 also provides an opportunity for data fusion between the FADEC 14 and EWSN data sources to automatically and wirelessly forward data to the Engine Service Provider operation center 562 for post flight analysis and allow detection, diagnosis and prognosis of problems occurring within different turbine components. The data obtained from the EWSN 600 provides for early detection and diagnosis of turbine component faults and helps prevents catastrophic failures and allows real-time data acquisition for valuable engine operational, performance and design information. The flight deck 20 can include the cabin wireless LAN unit 532 that includes a processor or other CPU 574 for local engine diagnostics.

The WEMS module 10 is beneficial for power generation design such that aircraft turbine designers benefit from data collected during continuous field operation of their engines. This allows for design improvements in the safety, reliability and efficiency of future engine systems. Mission critical networks (MCN) will also be able to explore related opportunities for the commercial aviation market based on data obtained by the WEMS module interoperative with the EWSN 600, which is a potential driver for future electronic enabled airplane health management (AHM) that is real-time, continuous and proactive. One beneficial opportunity is applicable to commercial/military helicopter technology with health and usage monitoring systems (HUMS).

Different wireless engine sensors can be used in the engine wireless sensor network 600. Typically, each wireless engine sensor forms a wireless engine sensor node and provides a radio interface and processor capability. The wireless engine sensors can operate at 600 or more degrees Centigrade in the harsh environment of the jet turbine engine to measure strain, heat and gas. These wireless engine sensors are advantageous over wired sensors that are difficult, impractical or expensive and difficult to implement with rotating components that damage the wire leads, making wired sensors impractical in an aircraft engine. Some wireless engine sensors use a passive power source because battery power is not feasible. These wireless engine sensors are typically lightweight and conformal for use on different rotating and non-rotating surfaces and can operate inside the turbine jet engines without unbalancing the engine or disrupting the aerodynamics. It is possible for the wireless engine sensors to measure strain with 50 KHz variations and operate at even higher frequencies with modal vibrations that occur two to about three times the vane passing frequency. In one example, the wireless engine sensors are formed from surface acoustic wave (SAW) devices that operate in excess of 1,000 Degrees C., thus allowing them to be used for different wireless strain, temperature and sensing applications in severe radio frequency (RF) multipath and Doppler environments. In one non-limiting example, SAW sensors capture the RF energy from a resonant antenna structure during interrogation such as a signal emanating from the transceiver of the WEMS module to excite the different surface acoustic waves by piezoelectric coupling to a substrate material. Typically the acoustic waves are delayed between metallic reflectors in proportion to the strain experienced at that instant when strain is imparted, and thus, the strained sensing is intrinsic to the device. The reflected acoustic wave is re-radiated back into the RF domain and the now-modulated data signal is received by the remote RF interrogation unit such as by the transceiver at the WEMS module and process engine data through any associated EWSN CPU. Any differential time delay between the two strain reflectors is computed, for example, at the EWSN CPU in this non-limiting example based on the phase of the received signal. Any time span between the RF "data" and the "reference" signals is typically about 100-200 nanoseconds and thus a jet engine spinning at a high RPM is frozen in position when the data points are collected.

The advantages of the wireless engine sensors as described include the passive power feature with no complex circuitry failing at high temperatures together with the wireless technology that is small, lightweight and conformal to minimize the impact on engine performance.

It is also possible to have a passive, wireless engine sensor network 600 that uses a microwave acoustic sensor, for example, using acoustic wave technology as a bulk acoustic wave (BAW) device, film bulk acoustic resonator (FBAR), acoustic plate mode (APL) device, or a surface acoustic wave (SAW) device as described above. The SAW devices typically have a layer of metallic electrodes on the surface of the piezoelectric crystal and operate by transducing the electrical signal to electromechanical waves that propagate on the surface of the crystal. The piezoelectric crystals form under the application of the electrical signal. A SAW delay line can be used with input and output structures formed as a periodic interdigitated transducer (IDT) electrode structure with several wavelength periodicities. The synchronous operation of the IDT at the surface launches the electromechanical wave that propagates at, for example, $3 \times 10^3$ M/S with orders of magnitude slower than the propagation of an electromagnetic wave in a vacuum.

For this reason, the term "delay line" is also applied to the wireless engine sensors, typically a few millimeters to sub-millimeters long depending on frequency of operation from a few MHz to several GHz. Using an RF interrogating signal from the WEMS module, for example, the device is advantageously operating as a passive device. Batteries or other external power sources are thus not required. Different acoustic wave materials can be used such as quartz, lithium niobate, and lithium tantalate. Also, different piezoelectric crystals such as langasite can be used. The interdigitated electrodes used in the wireless engine sensors are typically high temperature and stable materials, for example, formed as Pt/Rh/$Zro_2$ electrodes in one non-limiting example. Different wireless interrogation systems can be incorporated in the WEMS module, or in a separate controller, which in turn interoperates with the WEMS module. The systems can include 15-bit coded transducers operating with COMA communications technology and frequency-modulated continuous-wave or frequency-step continuous-wave sensors (FMCW or FSCW). A high-Q resonator response provides some system for sensing based on variation of the resonant frequency.

The wireless engine sensors can also use microelectromechanical systems (MEMS) technology. It is possible to use RF powered LC sensors and high temperature thermo-couples or even optical sensors. For example, a thermo-couple can measure temperatures up to 2,300° C. An RF powered LC temperature sensor can use a high-K temperature sensitive ceramic material to realize LC tank temperature sensing with a high-K temperature sensitive ceramic material. It is an inductively powered system that generates a time varying electromagnetic field where any temperature data as the resonant frequency is transmitted to a reader corresponding to the WEMS module through an inductive link of its transceiver in one example. The resonant frequency of the remote reader changes when the capacitance of the wireless engine sensor changes and responds to the various environmental variables such as the temperature. A wireless engine sensor can be formed as a ceramic multilayer capacitor integrated with a planar inductor that forms the LC resonant circuit. The capacitance of the sensor is a function of the electric constant of the sensitive material and the planar configured capacitor has a linear dielectric constant variation with temperature.

The wireless engine sensor could be formed as an inductor with a lead-lanthanum-zirconate-titanate (PLZT) ceramic capacitor having temperature dependent characteristics. It can include an inductor-capacitor (L-C) tuned electronic oscillator that incorporates the temperature sensitive materials with a change in the value of the capacitance due to the temperature variation translated into modulation in the oscillator frequency. This results in the change in electric field that affects the frequency of the resonating harmonic response. The transceiver at the WEMS module (or a separate reader device interfaced with the WEMS module) detects the temperature changes by monitoring the impedance across the terminals of the antenna as part of a sensor node. It can use a ceramic coated with a conductive layer of NiCr and a parallel plate temperature sensing element design that incorporates a thick film high-K temperature sensitive ceramic material and thick film electrode to make sensor easy to attach and use on rotating components.

Different wireless engine sensors may be formed as a temperature sensor, pressure sensor, vibration sensor, proximity sensor or position sensor with appropriate signal conditioning circuitry. A communications module could implement communications using a BFSK (binary phase shift key) modulation and frequency hopping spread spectrum (FHSS) multiple access with a digital data interface, frequency synthesizer, and transmitter and receiver. Microprocessor and programmable logic can be included as a communications protocol stack implementation. Each wireless engine sensor as a node could transmit its own power capability data in order to receive power data from one or more other sensor nodes and can determine an optimum data transmission route through a wireless sensor communication network. Typically a data transmission route would be through the wireless sensor node or nodes that have the greatest power capability. Some power routing can be implemented with one of at least ad-hoc, on-demand distance vector routing protocol (AODD), dynamic source routing (DSR) and global state routing (GSR). Each wireless engine sensor node could also transmit data representative of its position and if in a fixed position that position data will be a constant. If the wireless engine sensor is located on a rotating component, then the sensor position would change, and the position data would be preferably transmitted simultaneously with the sensor data and power capability data. It is possible to use any received identification data to determine if a wireless engine sensor node transmits identification data as a member of the network. Each wireless engine sensor node could be assigned a given access time to the network similar to a TDMA system. It is possible to use a vibration-powered generator as part of the power supply that is driven by engine vibration and converts mechanical power to electrical power. Different power scavenging mechanisms can be implemented using MEMS technology to make the nodes as small as possible.

As noted before, the WEMS module 10 includes an EWSN CPU as shown in FIG. 13 that could be remotely configurable by a processor in the WEMS module, on the crew or a processor at the flight deck, or by the Engine Service Provider operations center 562. The operations center can also transmit instructions to the EWSN 600 via the WEMS module to vary sampling rates on specific wireless engine sensors. The sampling rates are programmable for each of the different wireless engine sensors to permit programmable sensor monitoring, provide detection and diagnosis of faults and allow intelligent maintenance for "real-time" monitoring of critical engine parameters using "customized sampling."

Figure 14:
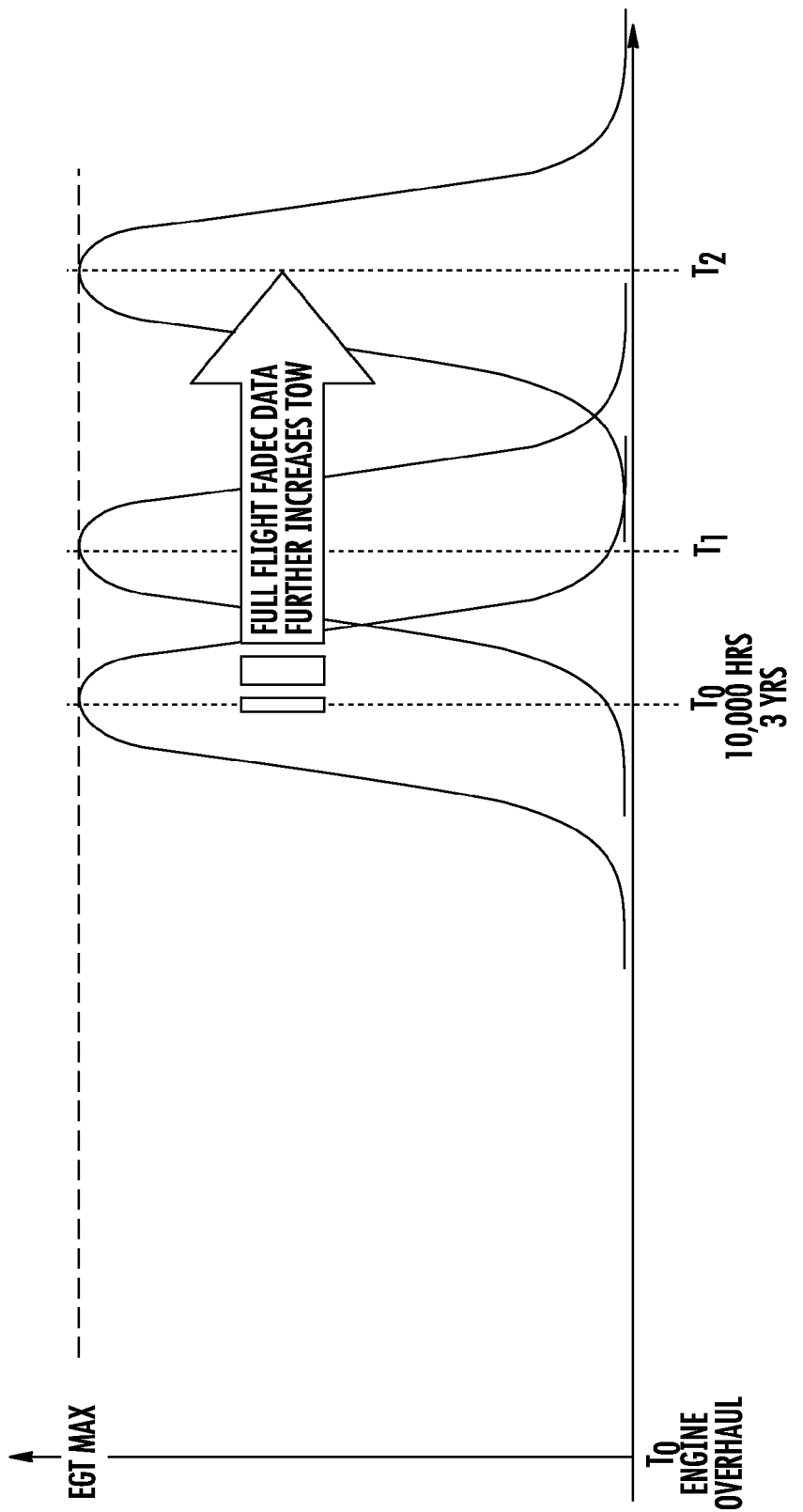
FIG. 14 is a graph showing how the full flight engine data can be used to maximize the time-on-wing (TOW) for an aircraft engine.

FIG. 14 is a graph showing that the full flight automated engine data can be used to maximize time-on-wing (TOW). Current generation engines provide "hundreds" of parameters and data sampling typically occurs at one second intervals and can result in lower MCPH costs.

Figure 15:
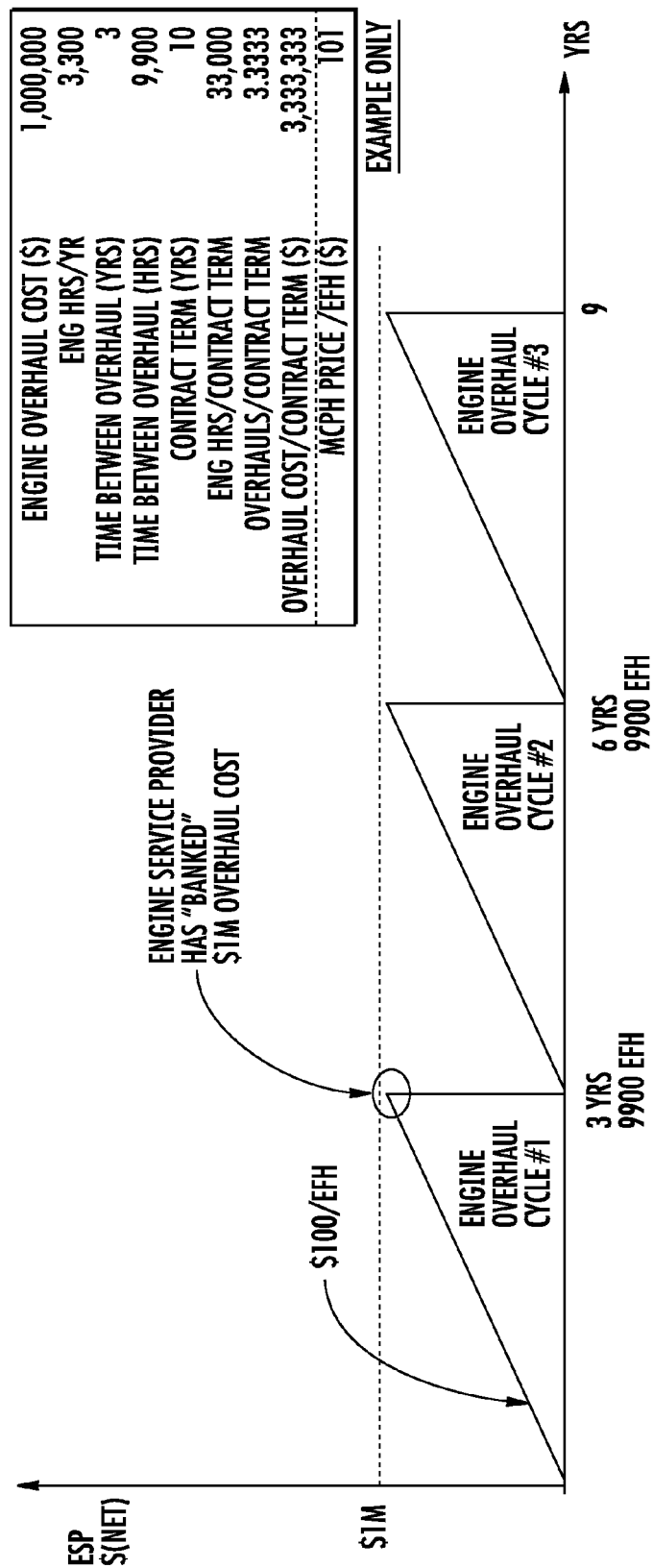
FIG. 15 is a graph showing representative metrics as a non-limiting example in which airlines can be provided with predictable engine maintenance operating costs as a non-limiting example.

FIG. 15 is a graph illustrating representative metrics in which "fixed price" operating contracts are used and showing an example engine overhaul cost as a non-limiting example with an established round figure of $1 million as an example only. The different times between overhaul and the years and hours with different contract terms are shown as a non-limiting example. This provides airlines with the predictable maintenance reserve for engine maintenance operating costs to prevent expensive. e.g., on the order of about a million dollars, to minimize engine overhaul "surprises." Several engine service providers offer "fixed price" engine maintenance programs with the savings at the maintenance costs per hour, power-by-the-hour and a 10-year LTSA (Long Term Service Agreement).

Figure 16:
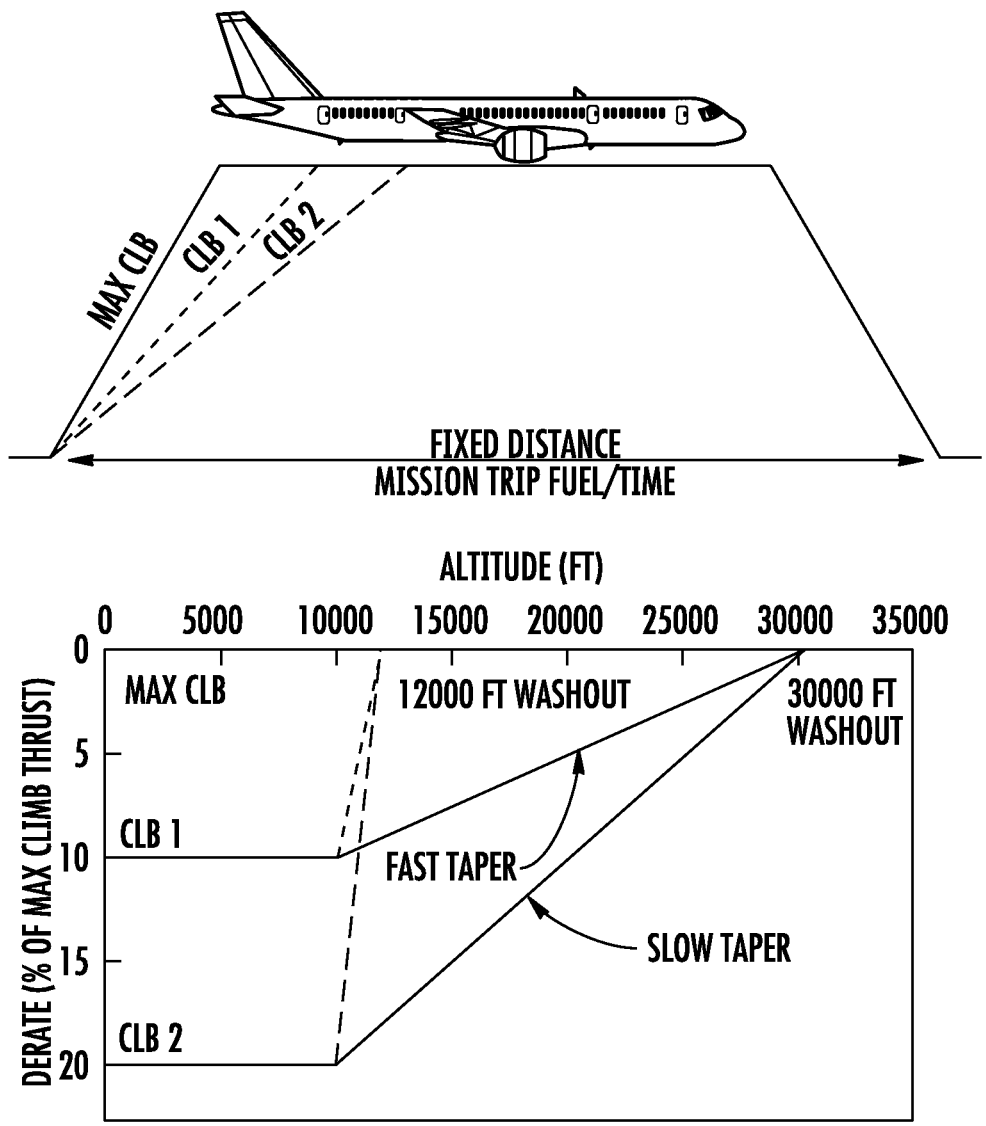
FIG. 16 is a graph showing derate vs. altitude with percentage of maximum climb thrust.

FIG. 16 is a graph showing a climb derate benefit.

Use of EWSN in conjunction with the WEMS module provides for improved monitoring of reduced thrust take-offs to the minimum required for safe take-off because different wireless engine sensors can be sampled at a greater rate, for example, at take-off and thrust could be adjusted. On some occasions when the full thrust would be more than safely required such as for lower weight flights, long runway or head wind, it is possible to choose a thrust setting below the full thrust by telling the engines via the FMC (Flight Management System) that the OAT (Outside Air Temperature) is much higher. Temperature control using the EWSN is beneficial and various take-off tables can be used as assistance.

Typically the exhaust gas temperature (EGT) margin refers to the buffer between the engine's normal operating EGT temperature and its maximum EGT, i.e., the temperature at which it must be inspected, overhauled or replaced. A higher EGT is an indication of the HPC wear that can cause compressor stall. Different variables can be measured such as flow through a fuel metering valve, a variable bleed valve, variable stator vein, the fan speed ($N_1$), the core speed ($N_2$), fan inlet temperature, fan inlet pressure, the LPC outlet temperature, the combustor static pressure, the HPT exhaust gas temperature and the core exhaust pressure. Other actuators can be measured including the fuel flow (WF), variable bleed valve (VBV) and variable stator veins (VSV) operation.

Typically the EGT is a primary measure of engine health. The EGT can be compared with the primary engine power indication called the engine pressure ratio (EPR). For example, at full power EPR there is a maximum permitted EGT limit. Once an engine reaches a stage where it reaches this EGT limit, the engine requires maintenance. The amount below the EGT limit is the EGT margin and this margin would be greatest when the engine is new or has been overhauled. The EGT margin is a buffer between an engine's normal operating EGT temperature and its maximum EGT and the higher EGT is an indication of the HPC wear that can cause a compressor stall. Engines are rarely used at the full thrust rating and usually have a level of derate for take-off power that reduces the EGT and increases the EGT margin. Derates at 5% and 10% will reduce EGT and increase the EGT margin by as much as 36 degrees. Derating can be used if the aircraft take-off weight is less than permitted maximum take-off weight (MTOW) and a long runway is available or the OATS are relatively low.

Air frame health management allows in-flight diagnosis and assessment through the integration of the wireless engine sensors, sensoring materials and advanced algorithms that reconstruct damage fields and estimate structural durability and remaining useful life. These algorithms could be incorporated within the WEMS module and incorporate advanced information processing techniques including neural networks, expert systems, fuzzy logic systems, pattern recognition, signal processing for spectral analysis and feature extraction and statistical algorithms for detection, estimation, prediction and fusion. It is also possible to use the EWSN 600 and WEMS module 10 to maintain LRU (line replaceable unit) fault states that have a gas path impact such as offset errors in gas path sensors or actuators. This could reduce false alarms and false ambiguities. The WEMS module 10 as described also enables greater control over life limited parts (LLP) such as the rotating turbine engine parts that are critical to engine integrity and are difficult to inspect outside the engine. The WEMS module 10 in conjunction with the wireless sensor network 600 provides engine condition base maintenance (CBM) to optimize engine maintenance costs while increasing operational performance with advanced fleet management and removal planning of aircraft engines.

This application is related to copending patent applications entitled, "WIRELESS ENGINE MONITORING SYSTEM AND ASSOCIATED ENGINE WIRELESS SENSOR NETWORK," U.S. patent application Ser. No. 13/489,665 filed Jun. 6, 2012, and "WIRELESS ENGINE MONITORING SYSTEM AND CONFIGURABLE WIRELESS ENGINE SENSORS," U.S. patent application Ser. No. 13/489,701 filed Jun. 6, 2012, by the same assignee and inventor, the disclosures which are hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A monitoring system for an aircraft engine, comprising:
a plurality of wireless engine sensors mounted on the aircraft engine and each configured to sense an engine parameter as engine data and transmit wirelessly the engine data and receive data to change the respective operation of the engine parameter sensing in a wireless engine sensor;
an engine monitoring module comprising:
a housing configured to be mounted at the aircraft engine,
a first wireless transceiver carried by the housing,
a memory carried by the housing,
a processor carried by the housing and coupled to the memory and the first wireless transceiver and configured to:
collect and store in said memory engine data relating to at least one engine parameter sensed during operation of the aircraft engine by the plurality of engine sensors and transmit the engine data via the first wireless transceiver over a wireless communications signal; and
a wireless local area network (LAN) communications unit located within the aircraft and forming a wireless access point and wireless LAN within the aircraft, the wireless LAN communications unit including a wireless communications unit configured to receive the engine data transmitted from the first wireless transceiver, and further comprising an aircraft processor located within the aircraft and associated with the wireless communications unit and configured to receive and process the engine data from the communications unit during the flight of the aircraft and process the engine data and determine engine operating parameters and engine sensor operation of at least one engine sensor and transmit back to the engine monitoring module data regarding engine parameter sensing in the at least one engine sensor, wherein selected ones of the plurality of wireless engine sensors receive the data regarding engine parameter sensing and change the operation of a respective sensor for a different engine parameter sensing operation.

2. The system according to claim 1, wherein said processor is configured to determine engine operating parameters based on the sensed engine data.

3. The system according to claim 2, wherein said processor at the aircraft determines an engine shutdown during flight of the aircraft.

4. The system according to claim 1, and further comprising a second wireless transceiver located within the aircraft and operatively connected to the wireless communications unit and configured to receive the engine data via the wireless LAN and transmit the engine data from the second wireless transceiver over a communications signal from the aircraft.

5. The system according to claim 4, wherein said second wireless transceiver comprises a UHF transmitter configured to transmit the engine data over an air-to-ground communications signal.

6. The system according to claim 4, wherein said second wireless transceiver is configured to transmit the engine data over a satellite communications link.

7. The system according to claim 1, wherein said first wireless transceiver at the engine monitoring module is configured to transmit the engine data and a data address linked to an identifier of the aircraft engine.

8. A method of monitoring an aircraft engine, comprising:
mounting a plurality of wireless engine sensors on the aircraft engine and each configured to sense an engine parameter as engine data and transmit wirelessly the engine data and receive data to change the respective operation of the engine parameter sensing in a wireless engine sensor;
mounting an engine monitoring module at the aircraft engine, said engine monitoring module comprising a housing that is mounted at the aircraft engine, a first wireless transceiver carried by the housing, a memory carried by the housing, and a processor coupled to the memory and the first wireless transceiver;
collecting and storing in the memory engine data relating to at least one engine parameter sensed during operation of the aircraft engine by the plurality of engine sensors;
forming a wireless local area network (LAN) within the aircraft by locating a wireless local area network (LAN) communications unit comprising a processor, wireless access point and wireless communications point within the aircraft;
transmitting the engine data from the first wireless transceiver of the engine monitoring module via the wireless LAN to the wireless communications unit and receiving and processing within the processor data regarding engine sensor operation of at least one engine sensor and transmitting back to the engine monitoring module data regarding engine parameter sensing in the at least one engine sensor; and
transmitting to selected ones of the plurality of wireless engine sensors data regarding engine parameter sensing and changing the operation of a respective sensor for different engine parameter sensing operation.

9. The method according to claim 8, and further comprising determining engine operating parameters based on the sensed engine data.

10. The method according to claim 9, and further comprising deciding an engine shutdown during flight of the aircraft.

11. The method according to claim 8, and further comprising assigning a data address to the engine monitoring module and linking the data address to an engine serial number for tracking the aircraft engine.

12. The method according to claim 8, and further comprising receiving sensed engine parameters within the engine monitoring module collected from the plurality of engine sensors formed as wireless engine sensors configured into an engine wireless sensor network.

13. The method according to claim 8, and further comprising transmitting the engine data via the wireless LAN from the wireless LAN communications unit to a second wireless transceiver located within the aircraft and transmitting the engine data from the second wireless transceiver over a communications signal from the aircraft.

14. The method according to claim 13, and further comprising transmitting the engine data via the second wireless transceiver over a satellite communications link.

15. The method according to claim 13, and further comprising transmitting the engine data via the second wireless transceiver over a air-to-ground communications signal.

16. The method according to claim 15, and further comprising transmitting the engine data over an Ultra High Frequency (UHF) communications signal as the air-to-ground communications signal.

* * * * *